United States Patent
Giuffrida

(10) Patent No.: US 12,464,246 B2
(45) Date of Patent: Nov. 4, 2025

(54) VARIABLE FOCAL LENGTH MULTI-CAMERA AERIAL IMAGING SYSTEM AND METHOD

(71) Applicant: Pictometry International Corp., Rochester, NY (US)

(72) Inventor: Frank Giuffrida, Honeoye Falls, NY (US)

(73) Assignee: Pictometry International Corp., Rochester, NY (US)

( * ) Notice: Subject to any disclaimer, the term of this patent is extended or adjusted under 35 U.S.C. 154(b) by 0 days.

(21) Appl. No.: 18/249,643

(22) PCT Filed: Oct. 19, 2021

(86) PCT No.: PCT/US2021/055630
§ 371 (c)(1),
(2) Date: Apr. 19, 2023

(87) PCT Pub. No.: WO2022/086976
PCT Pub. Date: Apr. 28, 2022

(65) Prior Publication Data
US 2024/0007752 A1     Jan. 4, 2024

Related U.S. Application Data

(60) Provisional application No. 63/093,562, filed on Oct. 19, 2020.

(51) Int. Cl.
*H04N 23/698* (2023.01)
*G01C 11/02* (2006.01)
(Continued)

(52) U.S. Cl.
CPC ........... *H04N 23/698* (2023.01); *G01C 11/02* (2013.01); *G03B 37/04* (2013.01); *H04N 23/695* (2023.01); *H04N 23/90* (2023.01)

(58) Field of Classification Search
CPC .... H04N 23/698; H04N 23/695; H04N 23/90; H04N 17/002; H04N 23/69; G01C 11/02; G03B 37/04; G03B 15/006
(Continued)

(56) References Cited

U.S. PATENT DOCUMENTS 5,668,595 A * 9/1997 Katayama ............ H04N 13/239
348/43
5,682,198 A * 10/1997 Katayama ............ G06T 1/0007
348/47
(Continued)

OTHER PUBLICATIONS

Fraser et al., "Zoom-Dependent Camera Calibration in Digital Close-Range Photogrammetry", Photogrammetric Engineering & Remote Sensing, vol. 72, No. 9, Sep. 2006, pp. 1017-1026.
(Continued)

*Primary Examiner* — Lin Ye
*Assistant Examiner* — Chan T Nguyen
(74) *Attorney, Agent, or Firm* — DUNLAP CODDING, P.C.

(57) ABSTRACT

Methods and systems are disclosed including an imaging system comprising an image-capturing system having two or more image-capturing devices and positioned on a platform over a predefined target area at a first altitude above the Earth, the image-capturing devices configured to capture a set of images depicting contiguous, substantially contiguous, or partially overlapping geographic coverage sub-areas within the predefined target area, the image-capturing devices having variable focal lengths and variable fields of view; and a computer system selectively adjusting the orientation of the field of view of at least one of the image-capturing devices based at least in part on a change in the focal length of the image-capturing device(s).

20 Claims, 12 Drawing Sheets

(51) Int. Cl.
  *G03B 37/04* (2021.01)
  *H04N 23/695* (2023.01)
  *H04N 23/90* (2023.01)
(58) Field of Classification Search
  USPC .................................................. 348/218.1
  See application file for complete search history.

(56) References Cited

U.S. PATENT DOCUMENTS

| | | | |
|---|---|---|---|
| 7,893,957 B2 | 2/2011 | Peters, III et al. | |
| 8,483,960 B2 | 7/2013 | Smitherman | |
| 8,649,596 B2* | 2/2014 | Schultz | H04N 1/6083 382/167 |
| 9,185,290 B1* | 11/2015 | Lapstun | H04N 23/58 |
| 9,440,750 B2 | 9/2016 | Lapstun et al. | |
| 2009/0256909 A1* | 10/2009 | Nixon | H04N 23/45 348/E5.024 |
| 2010/0295855 A1* | 11/2010 | Sasakawa | G01C 11/02 345/427 |
| 2013/0013185 A1 | 1/2013 | Smitherman et al. | |
| 2014/0063000 A1 | 3/2014 | Acree | |
| 2015/0221079 A1* | 8/2015 | Schultz | G01S 7/4808 382/190 |
| 2016/0150142 A1* | 5/2016 | Lapstun | B64D 47/08 348/36 |
| 2017/0195569 A1 | 7/2017 | Lapstun et al. | |
| 2017/0236024 A1* | 8/2017 | Wang | G06V 20/176 382/201 |
| 2017/0248421 A1 | 8/2017 | Cope et al. | |
| 2018/0218533 A1 | 8/2018 | Millin et al. | |

OTHER PUBLICATIONS

Frosio et al., "Camera Re-calibration after Zooming Based on sets of Conics", Vis Comput (2016) 32:663-674. Published online May 6, 2015; Springer-Verlag Berlin Heidelberg.

USPTO acting as International Searching Authority; International Search Report and Written Opinion regarding PCT/US21/55630, Jan. 14, 2022.

Pictometry International Corp., Response to Oct. 28, 2024 Examination Report from the UK Intellectual Property Office regarding Application No. GB2306447 adopting the issues identified by the Jan. 14, 2022 International Preliminary Report on Patentability regarding PCT Application No. PCT/US21/55630; Filed Feb. 28, 2025.

* cited by examiner

VARIABLE FOCAL LENGTH MULTI-CAMERA AERIAL IMAGING SYSTEM AND METHOD

CROSS-REFERENCE TO RELATED APPLICATIONS

This application claims the benefit and claims the benefit of U.S. Provisional Patent Application No. 63/093,562, filed Oct. 19, 2020, entitled "VARIABLE FOCAL LENGTH MULTI-CAMERA AERIAL IMAGING SYSTEM AND METHOD", which is hereby incorporated in its entirety herein.

FIELD OF THE DISCLOSURE

The disclosure generally relates to variable focal length multi-sensor image capture systems that includes two or more sensors having adjustable orientations of their fields of view, the resulting images of which may be used for the creation of a virtual mosaic image that is larger than any single sensor capture. The multi-sensor image capturing system may be a multi-camera aerial imaging system. The system is configured to change orientations of the fields of view of the two or more sensors in relation to one another, in conjunction with changes to the focal lengths, the resulting images of the two or more sensors depict substantially contiguous or partially overlapping geographic coverage sub-areas. The resulting images may be used to create the virtual mosaic image.

BACKGROUND

In the remote sensing/aerial imaging industry, imagery may be used to capture views of a geographic area in order to identify and measure objects and/or structures within the images as well as to be able to determine geographic locations of points within the image.

Traditionally, for aerial imaging, a manned or unmanned aircraft carries cameras to fly over geographic areas to capture nadir imagery (imagery captured from a nadir viewpoint) and/or oblique imagery (imagery captured from an oblique viewpoint) of the geographic areas. Many images can be captured during each flight resulting in large image libraries of captured images. After the images are captured during the various flights, the images may be processed through multiple steps in a post-capture processing stage, such as to color-balance the images and/or to geo-reference the images.

It is often desirable to combine multiple input images into a larger virtual composite "mosaic" image, such that the mosaic image covers a larger geographic area on the ground. Each input image, as well as the output mosaic image, is composed of discrete pixels (individual picture elements) of information or data. The most common form of this mosaic image is an "ortho-mosaic image" which is a virtual image created from a series of overlapping or adjacent input nadir images that are mathematically combined into a single ortho-rectified image. Additionally, Pictometry International Corp. of Rochester, New York, has patented processes to make and use "oblique-mosaic images" which are virtual images created from a series of overlapping or adjacent input oblique images that are mathematically combined into a single image, including those processes described in U.S. Pat. No. 7,873,238, titled "Mosaic Oblique Images and Methods of Making and Using Same", which issued on Jan. 18, 2011, and which is hereby incorporated by reference in its entirety herein.

The input images and the mosaic images may be used in a multitude of applications including, but not limited to, geological mapping, real estate improvements and/or assessments, structural assessments, utility infrastructure assessments (e.g., power lines, pipelines, phone lines), and more.

While conducting aerial imaging, it is desirable to have the input images partially overlap or be contiguous, or substantially contiguous, in depicting the geographic area, so as to cover a target area with as few flights over the target area as possible. Further, overlapping or substantially contiguous coverage may be helpful or necessary for further processing and/or creating the virtual mosaic image. Additionally, it may be desirable to change the focal lengths of the cameras during aerial imaging, such as, for example, when the altitude of the camera changes and/or to maintain or change resolution of the resulting images.

However, changing the focal length of a camera in order to change the resolution of the captured set of images changes the size of the field of view as well as the image area captured by the camera. Focal length determines the field of view (how much of an area is captured by the sensor) and the magnification/resolution (how large individual elements will be in the captured area). Generally, the longer the focal length, the narrower the field of view and the higher the magnification, while the shorter the focal length, the wider the angle of view and the lower the magnification.

As applied to aerial imaging systems, changing the focal length of multiple cameras results in gaps in the coverage area of images in a set of input images captured by the multiple cameras. In other words, the images are no longer contiguous or partially overlapping and/or no longer have the amount of overlap desired. For example, FIG. 1A illustrates a graphical representation of a simulated resultant image coverage area (A) of a multi-camera system having five fixed-positioned cameras with fixed focal lengths of 100 mm positioned at an altitude of 10,000 feet relative to a target area and a Field of View (FOV) of 19.2. Each of the five cameras captures an image depicting a corresponding geographic coverage sub-area A1, A2, A3, A4, A5. In the illustration of FIG. 1A, the geographic coverage sub-areas A1-A5 are contiguous, thus providing a continuous overall coverage area A.

It should be noted that a change in altitude alone does not affect whether the set of images is contiguous (that is, depict contiguous geographic coverage sub-areas), but rather affects the total amount of geographic area A that is depicted. This is illustrated in FIG. 13 which shows a simulated graphical representation of the coverage area of the same multi-camera system of FIG. 1A with the same focal lengths of 100 mm and FOV of 19.2, but positioned at an altitude of 5,000 feet relative to the target area. The geographic coverage sub-areas A1, A2, A3, A4, A5 are still contiguous, but cover a smaller overall geographic coverage area A.

However, increasing the focal length of the cameras of the multi-camera system to 200 mm, for example, changes the geographic coverage area A of the geographic area of the multi-camera system. As demonstrated in the simulation of FIG. 1C, changing the focal length of the multi-camera system of FIG. 1A from 100 mm to 200 mm and a FOV of 9.7 at an altitude of 10,000 feet relative to the target area results in coverage gaps in the resulting coverage area A, as compared to FIG. 1A.

Another example is illustrated in FIG. 1D, which depicts a simulated result of the same multi-camera system of FIG.

1A and shows that changing the altitude to 20,000 feet relative to the target area still creates gaps in the resulting coverage area A when the focal length of the multi-camera system of FIG. 1A is changed from 100 mm to 200 mm, and a FOV of 9.7, even though the overall coverage area A covers a larger geographic area than at an altitude of 5,000 feet or of 10,000 feet.

In order to create mosaic images without coverage gaps, the coverage gaps between the geographic coverage sub-areas A1, A2, A3, A4, A5 must be filled. Typically, in prior art systems, to fill the coverage gaps, multiple passes were made by the aircraft over the target area to capture additional images depicting the geographic areas in the coverage gaps. However, this required additional flight time, and the possibility of having to land and then fly additional flights over the area, which increases cost and the possibility of error (e.g., drift error).

To avoid creating coverage gaps, many prior art aerial imaging systems contain multiple cameras all having a fixed focal length. In many systems, the angle of view of each of the multiple cameras is also fixed such that a set of images captured simultaneously by the multiple cameras will be contiguous images (that is, depict contiguous geographic areas) or partially overlapping images (that is, depict overlapping geographic areas). Some prior art systems allowed for changes to the angle of view, but maintained a fixed focal length. For example, in Peters et al. (U.S. Pat. No. 7,893,957), the camera system includes an array of imaging sensors disposed in a retinal configuration. The relative position or alignment of the sensors can be adjusted to shift, narrow, or alter the capture area; however, the imaging sensors do not have a variable focal length. Similarly, in Lapstun et al. (U.S. Pat. No. 9,440,750), a camera unit having a plurality of steerable camera modules is described. A beam-steering mechanism is used to adjust the camera and provide a wider field of view; however, the focal lengths of the multiple camera modules are not variable. Smitherman (U.S. Pat. No. 8,483,960) also describes an imaging sensor system affixed to a vehicle. The imaging sensors are capable of being adjusted to shift, narrow or widen areas captured by the imaging sensors. However, similar to Peters and Lapstun, the multiple imaging sensors have a fixed focal length. In these prior art systems, there was no ability to change the focal length. Focal length changes were typically avoided in order to avoid coverage gaps, and because precise focal length settings are needed for further processing of the images.

What is needed are systems and methods that allow the focal length of multi-camera systems to be adjusted such as when altitude is changed such as to maintain or improve resolution of resulting images, while still capturing images depicting contiguous, substantially contiguous, or partially overlapping coverage areas, in order, for example, to create mosaic images without increasing the number of flight passes of a multi-camera aerial imaging system and/or to otherwise utilize the resulting images depicting a continuous coverage area.

SUMMARY

The problems of maintaining or creating partially overlapping or substantially contiguous sets of input images of a multi-sensor imaging system when focal lengths are changed is addressed through determination and adjustment of the orientations of the fields of view of the multi-sensor image system, and more particularly, the adjustment of an Offset Angle between centers of fields of views between two adjacent image-capturing devices.

In one aspect of the present disclosure, an imaging method is disclosed comprising determining, using one or more computer processor, for two or more image-capturing devices having corresponding first focal lengths, second focal lengths, and first orientations of fields of view, positioned on an aerial platform and configured to capture a set of input images comprising two or more corresponding input images, second orientations of the fields of view based at least in part on maintaining partially overlapping geographic coverage in the two or more input images; and sending, using the one or more computer processor, one or more signal to the two or more image-capturing devices, indicative of one or more command to change the first focal lengths to second focal lengths and to change the first orientations of the fields of view to the determined second orientations of the fields of view.

In one aspect of the present disclosure, the method may further comprise receiving, via the one or more computer processor, the set of input images having partially overlapping geographic coverage.

In one aspect of the present disclosure, the method may further comprise creating, with the one or more computer processor, one or more virtual mosaic image of a predefined target area utilizing the set of two or more input images.

In one aspect of the present disclosure, an imaging system may comprise an image-capturing system positioned on a platform such that the platform moves the image-capturing system over a predefined target area at a first altitude above the Earth's surface, the image-capturing system comprising: two or more cameras, each of the two or more cameras adjustable between a first focal length and a second focal length, and adjustable between a first orientation of a field of view and a second orientation of the field of view; the two or more cameras configured to capture a set of two or more input images depicting partially overlapping geographic coverage sub-areas when the two or more cameras are at the first focal length and the first orientation of the field of view; and one or more processor executing image display and analysis software configured to send one or more signal from the computer system to the image-capturing system to change the two or more cameras from the first focal length to the second focal length and to change the two or more cameras from the first orientation of the field of view to the second orientation of the field of view, wherein a change from the first focal length to the second focal length introduces coverage gaps between the geographic coverage sub-areas, and wherein the change from the first orientation of the field of view to the second orientation of the field of view eliminates the coverage gaps.

In one aspect of the present disclosure, the one or more processor may determine an amount of change from the first orientation of the field of view to the second orientation of the field of view based at least on the amount of change from the first focal length to the second focal length.

In one aspect of the present disclosure, the set of two or more input images has a substantially continuous coverage area within the predefined target area.

In one aspect of the present disclosure, the one or more processor may create one or more virtual mosaic image of the predefined target area utilizing the set of two or more input images.

In one aspect of the present disclosure, the set of two or more input images may be a first set of two or more input images, and the one or more processor executing image display and analysis software may read a second set of two or more input images subsequent to changing from the first orientation of the field of view to the second orientation of the field of view.

BRIEF DESCRIPTION OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

DETAILED DESCRIPTION

Figure 1A:
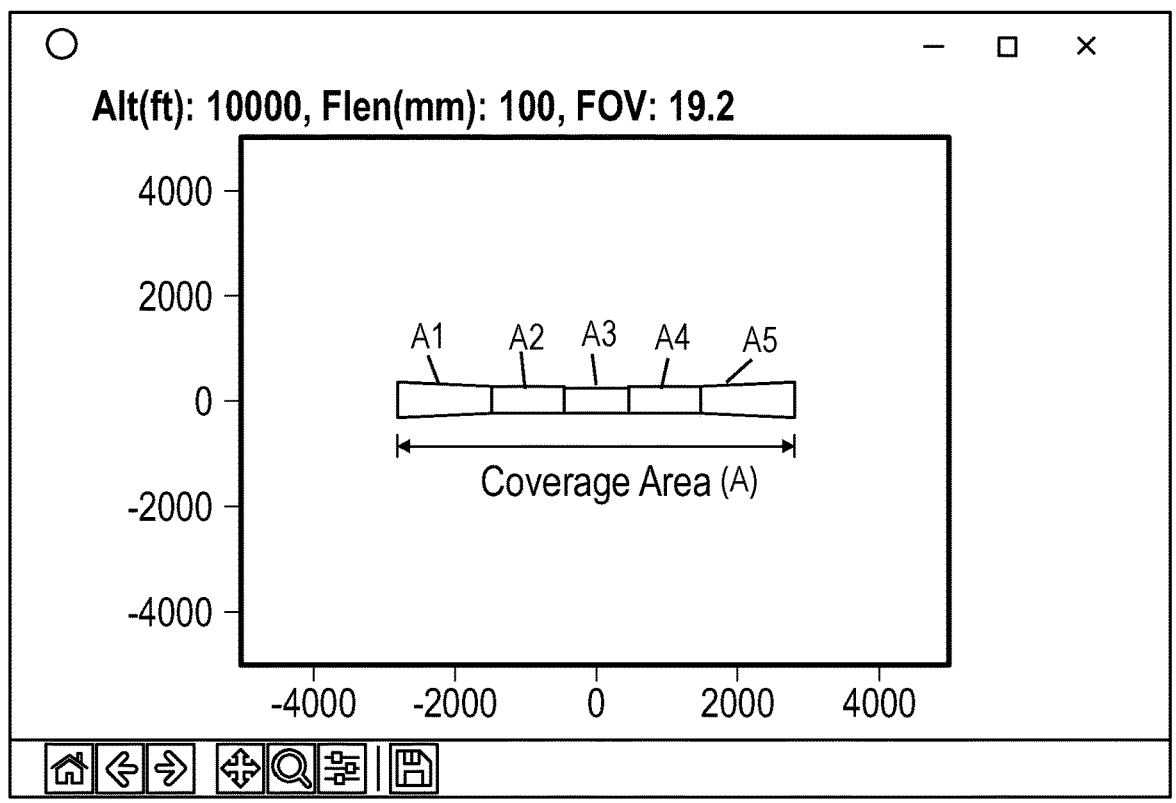
FIG. 1A is a graphical representation of capture area of a target area of a simulated, prior art multi-camera system having a fixed focal length and simulated at an altitude of 10,000 feet.

Generally, the systems and methodologies described herein are configured to provide adjustable focal lengths of a multi-sensor system, while creating contiguous, substantially contiguous, or partially overlapping images, which may be used, for example, to create a virtual mosaic image having a capture area of a target geographic area that is larger than what is capable of being captured from a single sensor. The virtual mosaic image of the capture area may be based on two or more substantially contiguous or partially overlapping input images, that is, a set of two or more input images that depict substantially contiguous geographic sub-areas or partially overlapping geographic sub-areas, captured by two or more sensors. A multi-camera system having variable focal lengths may be used to choose resolution of the resulting input images and mosaic images, without introducing gaps between the geographic sub-areas depicted in the input images, by adjusting orientations of the fields of views of the multi-camera system in conjunction with changes to the focal lengths. Accuracy may be increased and expense decreased in forming the virtual mosaic image when the input images are substantially contiguous or partially overlapping.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description, and should not be regarded as limiting.

The following detailed description refers to the accompanying drawings. The same reference numbers in different drawings may identify the same or similar elements.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

As used in the instant disclosure, the terms "provide", "providing", and variations thereof comprise displaying or providing for display a webpage (e.g., webpage having one or more images and software to permit measurement within the images), electronic communications, e-mail, and/or electronic correspondence to one or more user terminals interfacing with a computer and/or computer network(s) and/or allowing the one or more user terminal(s) to participate, such as by interacting with one or more mechanisms on a webpage, electronic communications, e-mail, and/or electronic correspondence by sending and/or receiving signals (e.g., digital, optical, and/or the like) via a computer network interface (e.g., Ethernet port, TCP/IP port, optical port, cable modem, combinations thereof, and/or the like). A user may be provided with a web page in a web browser, or in a software application, for example.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, any reference to "one implementation," "some implementations," "one embodiment," "an embodiment," "some embodiments," "one example," "for example," or "an example" means that a particular element, feature, structure or characteristic described in connection with the embodiment is included in at least one embodiment. The appearance of the phrase "in some implementations," or "in some embodiments," or "one example" in various places in the specification is not necessarily all referring to the same embodiment, for example. Elements and steps used in one embodiment may be used in other embodiments, unless expressly limited.

As used herein, qualifiers like "substantially," "about," "approximately," and combinations and variations thereof, are intended to include not only the exact amount or value that they qualify, but also some deviations therefrom, which may be due to manufacturing tolerances, measurement error, wear and tear, stresses exerted on various parts, rounding error, calculation error, computing error, physical or computational limitations in adjustability of apparatus components, and combinations thereof, for example.

As used herein, the term "continuous" means forming an unbroken whole, without interruption, while the term "substantially continuous" means that there may be some deviations from an unbroken whole and there may be some interruption, as defined by the term substantially.

As used herein, the term "contiguous" means sharing a common border. The term "substantially contiguous" means that there may be some deviations as defined by the term "substantially".

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like.

Software may include one or more computer readable instructions that when executed by one or more components cause the component to perform a specified function. It should be understood that the algorithms described herein may be stored on one or more non-transitory memory. Exemplary non-transitory memory may include random access memory, read only memory, flash memory, and/or the like. Such non-transient memory may be electrically based, optically based, and/or the like.

It is to be further understood that, as used herein, the term "user" is not limited to a human being, and may comprise, a computer, a server, a website, a processor, a network interface, a human, a user terminal, a virtual computer, combinations thereof, and the like, for example.

As used herein, the term "focal length" means an optical distance from a point where light rays converge to form a sharp image of an object to a sensor at the focal plane in a camera. Focal length determines the field of view (how much of an area is captured by the sensor) and the magnification (how large individual elements will be in the captured area). Generally, the longer the focal length, the narrower the angle of view and the higher the magnification, while the shorter the focal length, the wider the angle of view and the lower the magnification.

In general, a change in the focal length of an image-capturing device results in a change both to the resolution of the resulting image and to the location of the geographic coverage area depicted in the resulting image. When multiple image-capturing devices are used and the desired images are images that are of geographic coverage sub-areas that are contiguous or that partially overlap, changes to the focal lengths of the image-capturing devices may result in coverage gaps between the geographic coverage sub-areas and/or an undesirable amount of overlap depicted in the images. To solve this problem, the orientations of the fields of view of the image-capturing devices are changed in conjunction with changes to the focal lengths, to result in capturing contiguous or partially overlapping geographic coverage sub-areas in the input images. These input images may then be used to create one or more virtual mosaic-images, where the virtual mosaic-image is larger than any of the individual input images.

Figure 2:
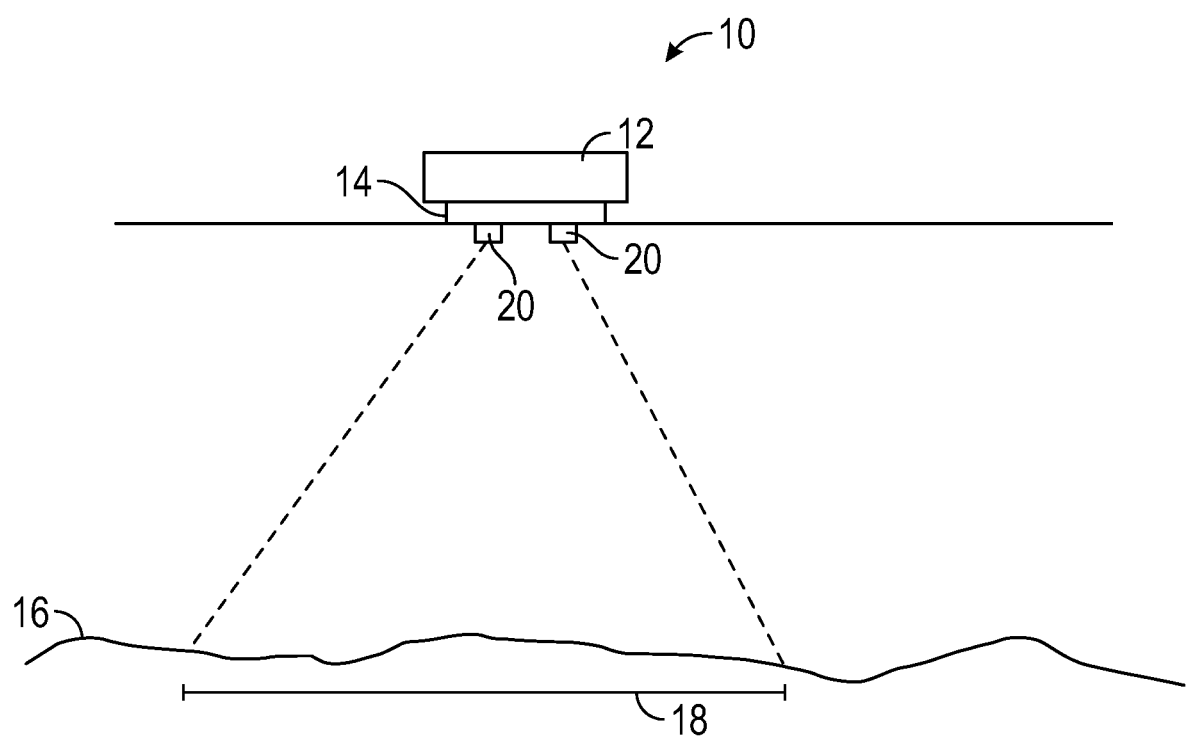
FIG. 2 is a diagrammatic view of an exemplary embodiment of an apparatus in accordance with the present disclosure.

Referring now to the Figures, and in particular to FIG. 2, shown therein is a schematic diagram of hardware forming an exemplary embodiment of an imaging system 10 for virtual image collection of a capture area 18 of a target geographic area in a location. The imaging system 10 may comprise a platform and/or vehicle 12 carrying an image-capturing system 14. The vehicle 12 may be, for example, an aircraft (e.g., airplane, drone, satellite) and/or terrain vehicle (e.g., car, bus, tank) and may be manned or unmanned.

Embodiments of the invention are applicable for use within photographic and/or imaging applications. For simplicity of description, the following description highlights the applicability within aerial photography and/or imaging applications; however, those skilled in the art of photographic and/or imaging applications will appreciate in reference to the description the applicability of the disclosure to a variety of photographic and/or imaging systems (e.g., vehicular photography and imaging, space photography and imaging, and so on).

The platform 12 may carry the image-capturing system 14 over or near an area of, and at one or more altitudes above, a surface 16. For example, the platform 12 may carry the image-capturing system 14 over a predefined target geographic area, and at one or more predefined altitudes above, the Earth's surface and/or any other surface of interest.

The platform 12 may be capable of controlled movement and/or flight. As such, the platform 12 may be manned or unmanned. In some embodiments, the platform 12 may be capable of controlled movement and/or flight along a predefined flight path and/or course. For example, the platform 12 may be capable of controlled movement and/or flight along the Earth's atmosphere and/or outer space. In some embodiments, the platform 12 may be capable of controlled movement and/or flight along a utility corridor or an agricultural area, for example. In some embodiments, the platform 12 may be capable of controlled movement and/or flight along a residential corridor and/or industrial area, for example.

The platform 12 may include a system for generating and/or regulating power. For example, the platform 12 may include one or more generators, fuel cells, solar panels, and/or batteries for powering the image-capturing system 14.

Figure 4:
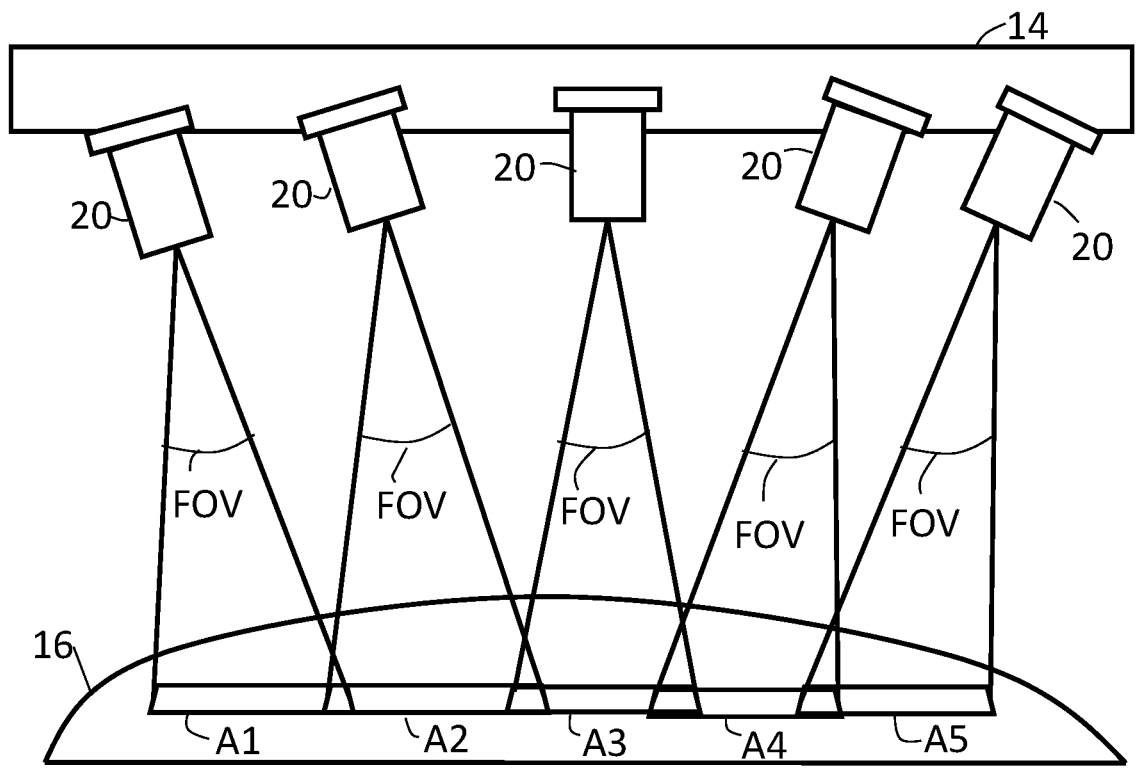
FIG. 4 is a diagrammatic view of an exemplary image-capturing system in accordance with the present disclosure.

Referring to FIGS. 2 and 4, the image-capturing system 14 may comprise two or more image-capturing devices 20, including a first image-capturing device and a second image-capturing device. In one embodiment, the image-capturing system 14 may include five or more image-capturing devices 20. While the figures illustrate the use of five image-capturing devices 20, it should be known that any number of image-capturing devices 20 greater than one may be used. The image-capturing devices 20 may be positioned within and/or on the platform 12.

Figure 3:
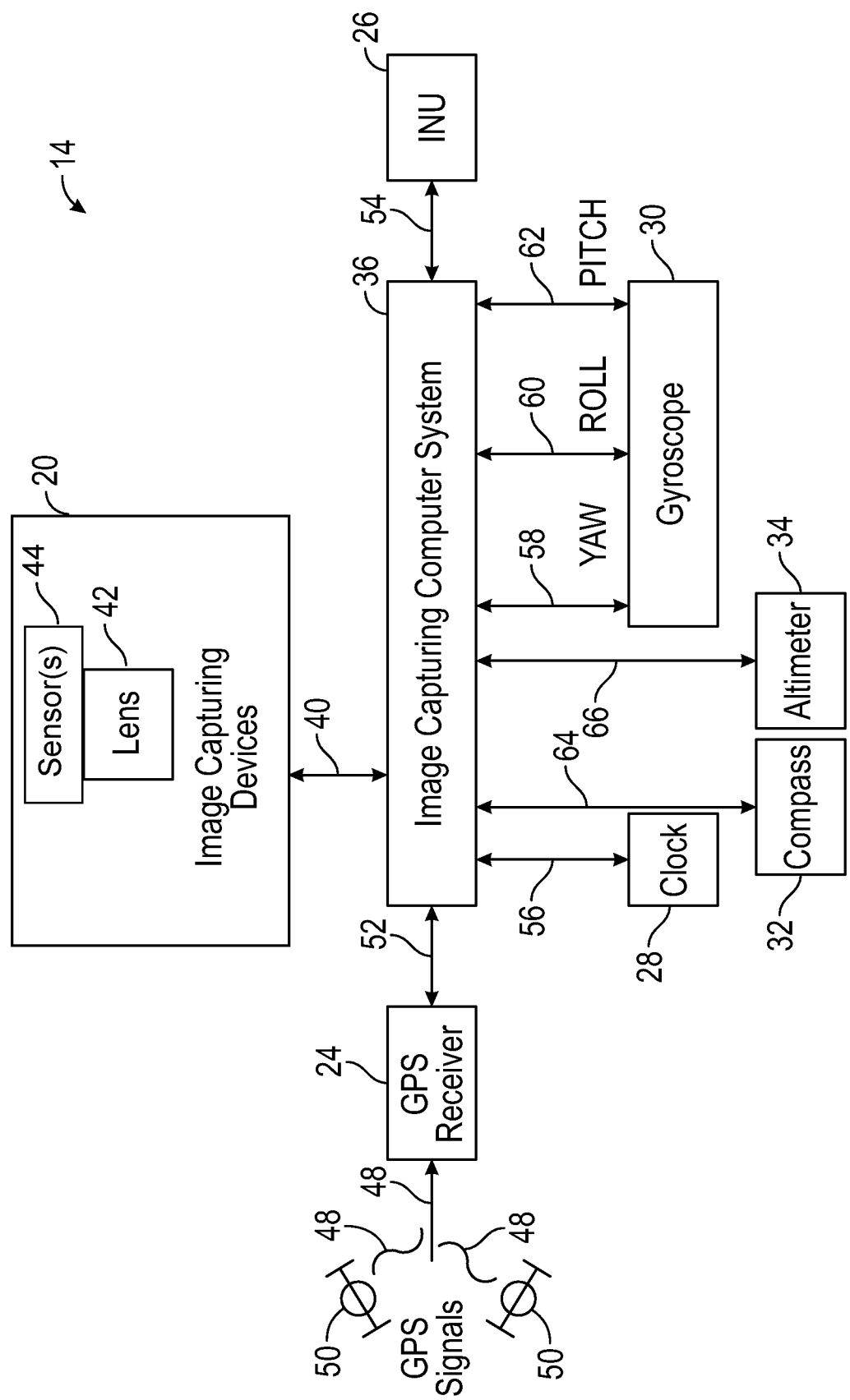
FIG. 3 is a diagrammatic view of the image-capturing system illustrated in FIG. 2.

Optionally, as shown in FIG. 3, the image-capturing system 14 may also include one or more components that may be used, in part, to provide sensor measurements that may be used to georeference input images captured by the image-capturing devices 20, and which may include one or more global positioning system (GPS) receiver 24, one or more inertial navigation unit (INU) 26, one or more clock 28, one or more gyroscope 30, one or more compass 32, and/or one or more altimeter 34. In some embodiments, one or more of the elements of the image-capturing system 14 may be interconnected with an image-capturing computer system 36.

Generally, the image-capturing devices 20 may be capable of capturing input images photographically and/or electronically. The input images comprise a plurality of pixels. The captured input images may be georeferenced and used to form one or more virtual mosaic image. The virtual mosaic image may be an ortho-rectified mosaic image or an oblique mosaic image or a combination mosaic image. The virtual mosaic image comprises a plurality of pixels.

Figure 5A:
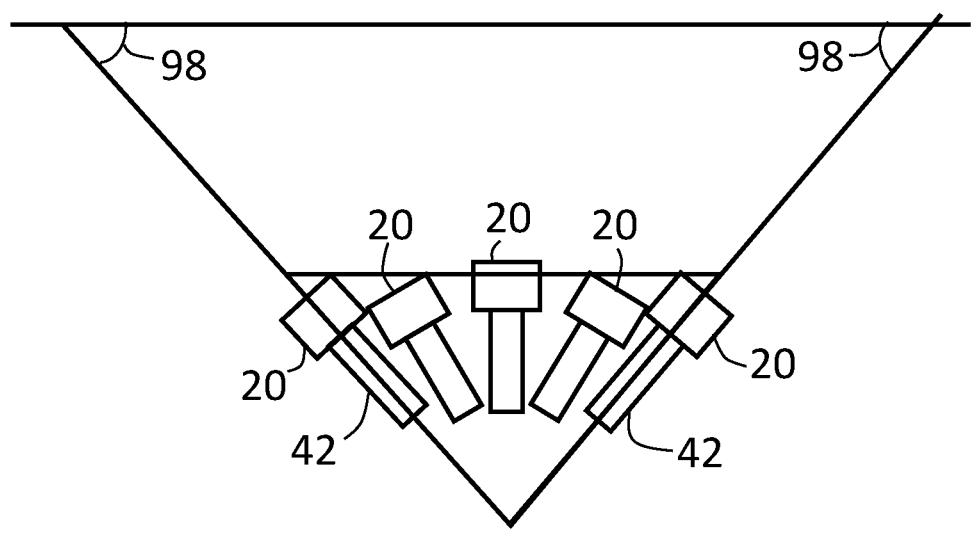
FIG. 5A is a diagrammatic view of exemplary image-capturing devices having first orientation fields of view and a first focal length in accordance with the present disclosure.
Figure 5B:
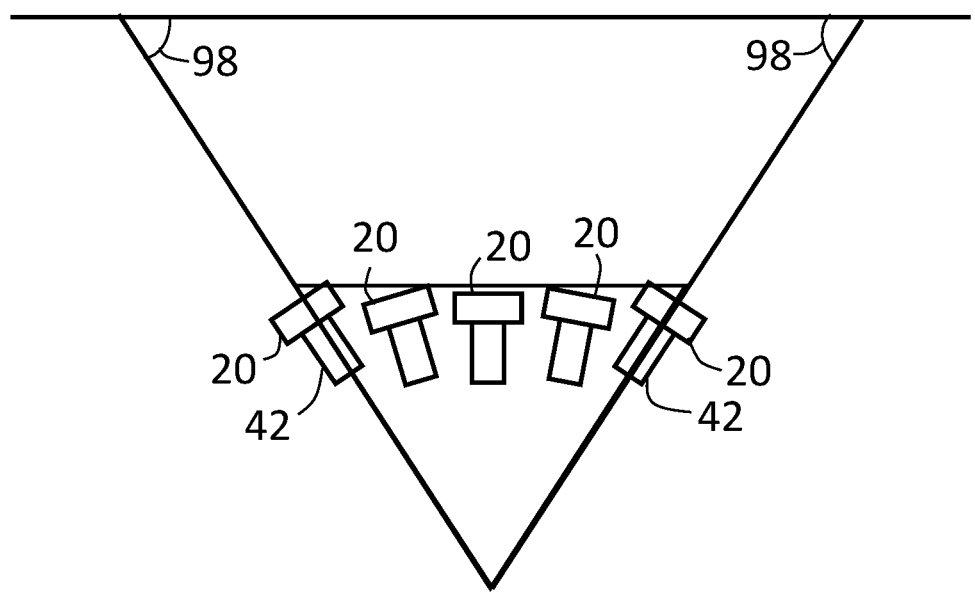
FIG. 5B is a diagrammatic view of the exemplary image-capturing devices of FIG. 5A having second orientation fields of view and a second focal length in accordance with the present disclosure.

As illustrated in FIGS. 5A and 5B, each of the image-capturing devices 20 are configured to have two or more focal lengths, and may be changed between a first focal length (FIG. 5A) of the two or more focal lengths and a second focal length (FIG. 5B) of the two or more focal lengths, thereby changing the resolution of the captured images. Changing the focal length of the image-capturing devices 20 changes image mapping parameters. The structure for changing focal lengths is well-known in the art and, as such, will not be detailed herein, but can include a physical change, such as a change to the physical length, an optical change, such as by the use of mirrors, and/or a computational change, such as the manipulation of sensors.

As shown in FIG. 3, in one embodiment, the image-capturing devices 20 may include one or more lens assembly 42. Variable focal length may be obtained via the one or more lens assembly 42. For example, in some embodiments, imaging system 10 may include one or more of the image-capturing devices 20 having one or more variable position sensor array wherein one or more sensors 44 may be fitted with one or more lens assembly 42 having variable focal length lenses. In some embodiments, each sensor 44 may have a separate lens assembly 42. In some embodiments, two or more sensors 44 may share one or more lens assemblies 42. Focal length may be increased or decreased via the one or more lens assembly 42. In some embodiments, adjustment of the lens assembly 42 may be manual, semi-automatic, or automatic. The lens assembly 42 may include, but is not limited to, a focal lens, zoom lens, filter lens, one or more mirrors, and/or the like.

Figure 7:
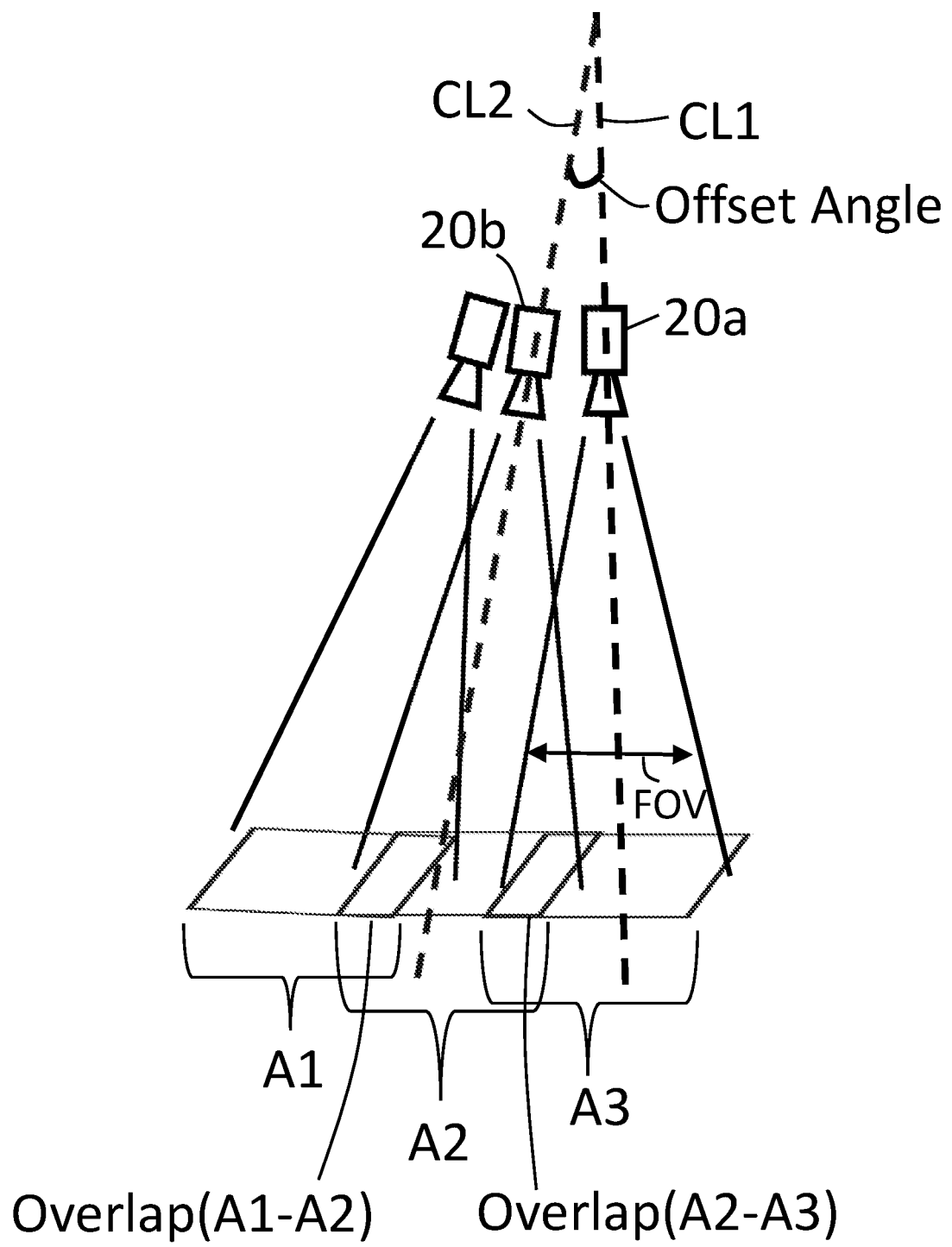
FIG. 7 is a graphical representation of exemplary image-capturing devices and simulated capture area, in accordance with the present disclosure.

Each of the image-capturing devices 20 has two or more orientations of fields of view (FOV). That is, each of the image-capturing devices 20 are positioned relative to the image-capturing system 14 such that an angle 98 of the combined fields of view (that is, the orientation of the field of view, also known as the direction of the field of views) of each of the image-capturing devices 20 is adjustable between at least a first orientation of the field of view, as shown in FIG. 5A, and a second orientation of the field of view, as shown in FIG. 5B. The angle 98 of the combined field of view may be, for example, the angle between a FOV centerline (CL) projected through the center of the field of view from the sensor 44 and the image-capturing system 14. As shown in FIG. 7, an Offset Angle between adjacent image capturing devices 20*a* and 20*b*, for example, may be the angle between a first FOV centerline (CL1) of the first image-capturing device 20*a* and a FOV centerline (CL2) of the second image-capturing device 20*b*, where the first image-capturing device 20*a* is adjacent to the second image-capturing device 20*b*. The term "adjacent" for purposes of defining the relationship between image-capturing devices 20 refers to image-capturing devices 20 that are originally configured to capture images that depict geographic sub-areas (A2, A3) that are contiguous or partially overlapping.

One or more of the image-capturing devices 20 may have a longitudinal axis generally parallel with the travel path or perpendicular to the travel path of the vehicle 12 or at some angle between zero degrees and 180 degrees to the direction of travel of the vehicle 12. Two or more of the adjacent image-capturing devices 20 may be forward looking (that is, having a field of view in the direction of travel of the vehicle 12) or rearward looking (that is, having a field of view away from the direction of travel of the vehicle 12). Two or more of the adjacent image-capturing devices 20 may be pitched at 45 degrees in relation to the plane of travel of the vehicle 12. Two or more of the adjacent image-capturing devices 20 may be orientated to have a field of view nadir. Two more of the adjacent image-capturing devices 20 may be orientated to have a field of view port-side or a field of view starboard-side in relation to the vehicle 12. In some implementations, the two or more image-capturing devices 20 includes first image-capturing devices 20 that are configured to be forward looking, second image-capturing devices 20 that are configured to be rearward looking, third image-capturing devices 20 that are configured be nadir looking, fourth image-capturing devices 20 that are configured to be port-side looking, and fifth image-capturing devices 20 that are configured to be starboard-side looking, in relation to the vehicle 12.

In one embodiment, each of the image-capturing devices 20 has a plurality of orientations of the fields of view (FOVn), such as the first orientation of the field of view FOV1, the second orientation of the field of view FOV2, a third orientation of the field of view FOV3, and so on, to an "n" orientation of the field of view (FOVn), and can be changed between one of the plurality of orientations of the field of view and another of the plurality of orientations of the field of view. Though the angle 98 of the field of view is shown in FIGS. 5A and 5B in a single mathematical plane and for only two of the image-capturing devices 20 for the sake of clarity, it will be understood that the angle 98 of the field of view may be in any mathematical plane or combinations of planes to result in the desired orientation of the field of view and may apply to all of the image-capturing devices 20. Further, it will be understood that the angle 98 may differ from one image-capturing device 20 to another image-capturing device 20.

In one embodiment, one or more of the image-capturing devices 20 may be mounted on one or more gimbals such that the image-capturing devices 20 are adjustable between the orientations of the fields of view. The gimbals may be controlled by the image capturing computer system 36 or manually, for example. The gimbals may be moved in response to the focal length(s) of the one or more image-capturing devices 20 being changed, to maintain or correct the coverage area A.

In one embodiment, one or more mirror is utilized to adjust the orientations of the fields of view. For example, a moveable mirror may be used to adjust the image-capturing devices 20 between the orientations of the fields of view. In one embodiment, a moveable mirror may be used to adjust the image-capturing devices 20 between the orientations of the fields of view without moving the entire image-capturing device 20. For example, when the focal length of the one or more image-capturing devices 20 is changed to a new focal length, the moveable mirror may be moved and then locked into place to be used for multiple image-captures at the new focal length, to maintain or correct the coverage area A.

Of course, it will be understood that other mechanisms may be used to position the image-capturing devices 20 to obtain a desired orientation of the field of view.

The image-capturing devices 20 may comprise sensors 44 capable of capturing images photographically and/or electronically and include, but are not limited to, conventional cameras, digital cameras, digital sensors, charge-coupled devices, infrared sensors (e.g., hyperspectral, multispectral), photocells, and/or the like. Each image-capturing device 20 may include an individual sensor 44 or set of sensors 44 configured to provide one or more images. For example, each image-capturing device 20 may include a sensor array with each sensor 44 of the sensor array providing an input image of a geographic area. In some embodiments, each image-capturing device 20 may be considered a single sensor 44 within an array of sensors. Image-capturing devices 20 and/or sensors 44 within the image-capturing system 14 may be similar, substantially similar and/or different and include a combination of varied image-capturing devices 20 and/or sensors 44.

In some embodiments, each image-capturing device 20 may be a sensor array wherein sensors of the sensor array provide the input images. For example, in some embodiments, the image-capturing device 20 may be a set of sensors 44 positioned within an array wherein each sensor may be independently configured to provide for at least one input image of a capture area 18 within the target geographic area. In some embodiments, the image-capturing devices 20 may be one or more ultra-high-resolution camera(s).

In some implementations, the image-capturing devices 20 may comprise one or more of: rolling shutter cameras, global shutter cameras, and push-broom sensor cameras. In some implementations, the image-capturing devices 20 are global shutter cameras.

In some implementations, the image-capturing devices 20 and or data corresponding to the image-capturing devices 20 may be calibrated. Calibration may be accomplished mechanically by setting focal length and orientation of the image-capturing devices 20. In some implementations, aerial triangulation of resulting captured images from the image-capturing devices 20 may be used as feedback to further refine the accuracy of the focal length and/or orientation of the image-capturing devices 20. In some implementations, the lens assemblies 42 of the image-capturing devices 20 may be calibrated for position versus focal length. The calibration of the lens assemblies 42 may be in real-time or may be completed in advance for a plurality of focal lengths and positions. Calibration may result in data outputs that may be used to increase accuracy of metadata associated with the image-capturing devices 20 and captured images. The metadata for each captured image may contain or may be updated to include focal length and orientation of the image capturing device 20 capturing the captured image, based on the calibrations.

The image-capturing devices 20 may be configured to capture one or more sets of input images depicting the geographic coverage sub-area A1 . . . An of the target geographic area, as shown in FIGS. 4, 5A, 5B, 6A, and 6B. The image-capturing devices 20 may issue one or more image data signals (IDS) 40 corresponding to one or more particular input images. Input images may be stored in the image-capturing computer system 36, such as in non-transitory memory 90 within the image-capturing computer system 36 (FIG. 8), for example, and/or in one or more external database.

In some embodiments, each image-capturing device 20 may have an orientation of a field of view (FOV) that encompasses a corresponding geographic sub-area A1 . . . An of the target geographic area, which may be captured in corresponding input images. The figures illustrate examples of five geographic sub-areas $A_1$-$A_5$ corresponding to five image-capturing devices 20; however, it will be understood that more or fewer image-capturing devices 20 and corresponding geographic sub-areas A1 . . . An may be used.

In general, the location of and the coverage of the geographic sub-areas $A_1$-$A_5$ within the target geographic area covered by resulting input images of the image-capturing devices 20 may be adjusted manually or via automation by adjusting one or more focal length and/or orientations of the fields of view of the image-capturing devices 20. In one embodiment, changing the orientations of the fields of view of the image-capturing devices 20 comprises changing the angular position of adjacent ones of the image-capturing devices 20 relative to each other, such that the Offset Angle between the adjacent image-capturing devices 20 and the angles 98 of the combined field of view of the image-capturing devices 20 are changed.

In some embodiments, each sensor of a sensor array of the image-capturing device 20 may be adjustable relative to one or more sensors 44 within the sensor array. Adjustability of the position of each sensor 44 within the array may be in any direction (e.g., within the x-direction, y-direction, z-direction, assuming a Cartesian coordinate system, for example) and/or any angle. Each sensor 44 of the array may be selectively adjusted such that one or more of the sensors 44 capture adjoining or partially overlapping geographic coverage sub-area $A_1$-$A_5$ within the capture area in the resulting images.

In some embodiments, the orientations of the fields of view of the image-capturing devices 20 may be selectively adjustable manually or by automation. Adjustment of the orientations of the fields of view of the image-capturing devices 20 in relation to each other may shift the geographic coverage sub-areas $A_1$-$A_5$ for the capture area of the target geographic area. By shifting the geographic coverage areas $A_1$-$A_5$, a continuous capture area 18 may be captured, such as for use in creating the mosaic image. For example, in some embodiments, automatic adjustment of the orientations of the fields of view of the image-capturing devices 20 may shift the image area $A_1$-$A_5$ of the image-capturing devices 20 such that two or more of the geographic capture sub-areas $A_1$-$A_5$ covered by the input images captured by the one or more image-capturing devices 20 are contiguous or substantially contiguous or partially overlap with one another.

In some embodiments, the imaging system 10 may include a passive system for adjusting orientations of the fields of view of one or more of the image-capturing devices 20 during use. For example, the image-capturing computer system 36 and/or user may analyze during flight (i.e., in use) one or more of the input images captured by the image-capturing devices 20. The image-capturing computer system 36 may analyze a plurality of pixels within the image to determine distance between captured image sub-areas $A1$ . . . $An$. Based on such analysis, the image-capturing computer system 36 may signal one or more of the image-capturing devices 20 to adjust the orientations of the field(s) of view of the image-capturing devices 20 (for example, by adjusting the angular position of the one or more image-capturing devices 20) and thereby adjust the one or more the geographic coverage sub-areas $A_1$-$A_5$ in relation to the other geographic coverage sub-areas $A_1$-$A_5$.

The image-capturing devices 20 may include known or determinable characteristics including, but not limited to, sensor size, aspect ratio, radial and other distortion terms, principal point offset, pixel pitch, alignment, and/or the like. Such data may be used to aid in determination of position and/or focal length of one or more sensors within the image-capturing devices 20, and/or may be used to aid in determination of geographic locations within the virtual image.

In one embodiment, the imaging system 10 may vary the focal length of the image-capturing devices 20 via an active system or a passive system. In some embodiments, the imaging system 10 may automatically adjust focal length of one or more image-capturing devices 20 during use. For example, the image-capturing computer system 36 may analyze during flight (i.e., in use) an image. The image-capturing computer system 36 may analyze a plurality of pixels within the image to determine sharpness of the image (e.g., analysis of adjacent pixels to determine sharpness). Based on such analysis, the image-capturing computer system 36 may signal the one or more lens assembly 42 to adjust the focal length of one or more of the image-capturing devices 20. The image-capturing computer system 36 may further determine the Offset Angle between adjacent ones of the image-capturing devices 20 that results in maintaining the contiguousness (or correcting) of the coverage sub-areas or maintaining (or correcting) the overlap of the coverage sub-areas. The image-capturing computer system 36 may change the Offset Angle to maintain (or correct) the contiguousness of the coverage sub-areas or maintain (or correct) the overlap of the coverage sub-areas based on the determination of the Offset Angle.

In some embodiments, focal length of the image-capturing devices 20 may be manually adjusted. For example, a user may be positioned within the vehicle 12 and/or within network range of the vehicle 12. The user may receive one or more images from the image-capturing devices 20 for review and/or one or more evaluative parameters including, but not limited to, altitude of the vehicle, current focal length of one or more image-capturing devices 20, sensor size, aspect ratio, radial and other distortion terms, principal point offset, pixel pitch, alignment, and/or the like. Using the one or more images from the image-capturing devices 20 and/or the one or more evaluative parameters, the user may send a signal to adjust the orientation(s) of the field(s) of view or adjust the focal length of one or more of the image-capturing devices 20 to maintain a substantially contiguous capture area and/or enhance sharpness of subsequent images.

In some embodiments, adjustability of the focal length and/or orientations of the fields of view of each sensor of the image-capturing device 20 may be semi-automated.

In some embodiments, focal length and/or orientations of the fields of view of the image-capturing device 20 (including Offset Angles) may be automatically adjusted, such as based on parameters provided to image-capturing computer system 36 and/or based on a mathematical relationship between a change in focal length, the corresponding change in the coverage area, and the orientations of the fields of view.

For example, as shown in FIG. 7, in some implementations, the amount of adjustment of the orientations of the fields of view (FOV) of image-capturing device 20 to maintain or regain a predetermined overlap of the coverage areas (or contiguous coverage areas) may be determined by determining the Offset Angle between a first image-capturing device 20*a* of the one or more image-capturing devices 20 and a second image-capturing device 20*b* of the one or more image-capturing devices 20.

Given a width of the sensor 44 that is perpendicular to the line of flight of the vehicle 12, for example, the focal length of the sensor, and a desired overlap of the image coverage sub-areas (Overlap(A2-A3)) on the ground, then the Offset Angle may be determined by the following:

$$FOV = 2*\tan^{-1}(SensorWidth/(2*FocalLength)) \quad \text{EQUATION 1}$$

$$\text{Offset Angle} = FOV*(1-\text{Overlap}) \quad \text{EQUATION 2}$$

For example, for a first image-capturing device 20*a* having a lens 42 having a focal length of 100 mm and having a sensor 44 having a width of 36 mm, and with a desired 10% overlap shown as Overlap(A2-A3) in FIG. 7, then, using equation 1:

$$FOV = 2*\tan^{-1}(36 \text{ mm}/(2*100 \text{ mm}))$$

$$FOV = 20.4 \text{ degrees}$$

And using Equation 2:

$$\text{Offset Angle} = 20.4*(1-0.10)$$

$$\text{Offset Angle} = 18.36 \text{ degrees}$$

The orientation of the first image-capturing device 20*a* and/or the second image-capturing device 20*b* may be adjusted such that the angle between the first FOV centerline (CL1) of the first image-capturing device 20*a* and the second FOV centerline of the second image-capturing device 20*b* matches the determined Offset Angle, thereby resulting in the captured images depicting the coverage sub-areas having a 10% overlap.

Returning to FIG. 3, in one embodiment the GPS receiver 24 may receive global positioning system (GPS) signals 48 that may be transmitted by one or more global positioning system satellites 50. The GPS signals 48 may enable the location of the platform 12 relative to the surface 16 and/or an object of interest to be determined. The GPS receiver 24 may decode the GPS signals 48 and/or issue location signals and/or data 52. The location signals and/or data 52 may be dependent, at least in part, on the GPS signals 48 and may be indicative of the location of the platform 12 relative to the surface 16 and/or an object of interest. The location signals and/or data 52 corresponding to each image captured by the image-capturing devices 20 may be received and/or stored by the image-capturing computer system 36, such as in the non-transitory memory 90 or other non-transitory memory, in a manner in which the location signals are associated with the corresponding image.

The INU 26 may be a conventional inertial navigation unit. The INU 26 may be coupled to and detect changes in the velocity (e.g., translational velocity, rotational velocity) of the image-capturing devices 20, and/or the platform 12. The INU 26 may issue velocity signals and/or data 54 indicative of such velocities and/or changes therein to image-capturing computer system 36. The image-capturing computer system 36 may then store, such as in the non-transitory memory 90 or other non-transitory memory, the velocity signals and/or data 54 corresponding to each image captured by the image-capturing devices 20.

The clock 28 may keep a precise time measurement. For example, the clock 28 may keep a precise time measurement used to synchronize events. The clock 28 may include a time data/clock signal 56. In some embodiments, the time data/clock signal 56 may include a precise time that one or more images is taken by the one or more image-capturing devices 20. The time data 56 may be received by and/or stored by the image-capturing computer system 36, such as in the non-transitory memory 90 or other non-transitory memory. In some embodiments, the clock 28 may be integral with the image-capturing computer system 36, such as, for example, a clock software program, for example.

The gyroscope 30 may be a conventional gyroscope commonly found on airplanes and/or within navigation systems (e.g., commercial navigation systems for airplanes). Gyroscope 30 may submit signals including a yaw signal 58, a roll signal 60, and/or a pitch signal 62. In some embodiments, the yaw signal 58, the roll signal 60, and/or the pitch signal 62 may be indicative of the yaw, roll and pitch of the platform 12. The yaw signal 58, the roll signal 60, and/or the pitch signal 62 may be received and/or stored by the image-capturing computer system 36.

The compass 32 may be any conventional compass (e.g., conventional electronic compass) capable of indicating the heading of the platform 12. The compass 32 may issue a heading signal and/or data 64. The heading signal and/or data 64 may be indicative of the heading of the platform 12. The image-capturing computer system 36 may receive, store and/or provide the heading signal and/or data 64 corresponding to each image captured by the image-capturing devices 20.

The altimeter 34 may indicate the altitude of the platform 12. The altimeter 34 may issue an altimeter signal and/or data 66. The image-capturing computer system 36 may receive, store and/or provide the altimeter signal and/or data 66 corresponding to each image captured by the one or more image-capturing devices 20.

Figure 8:
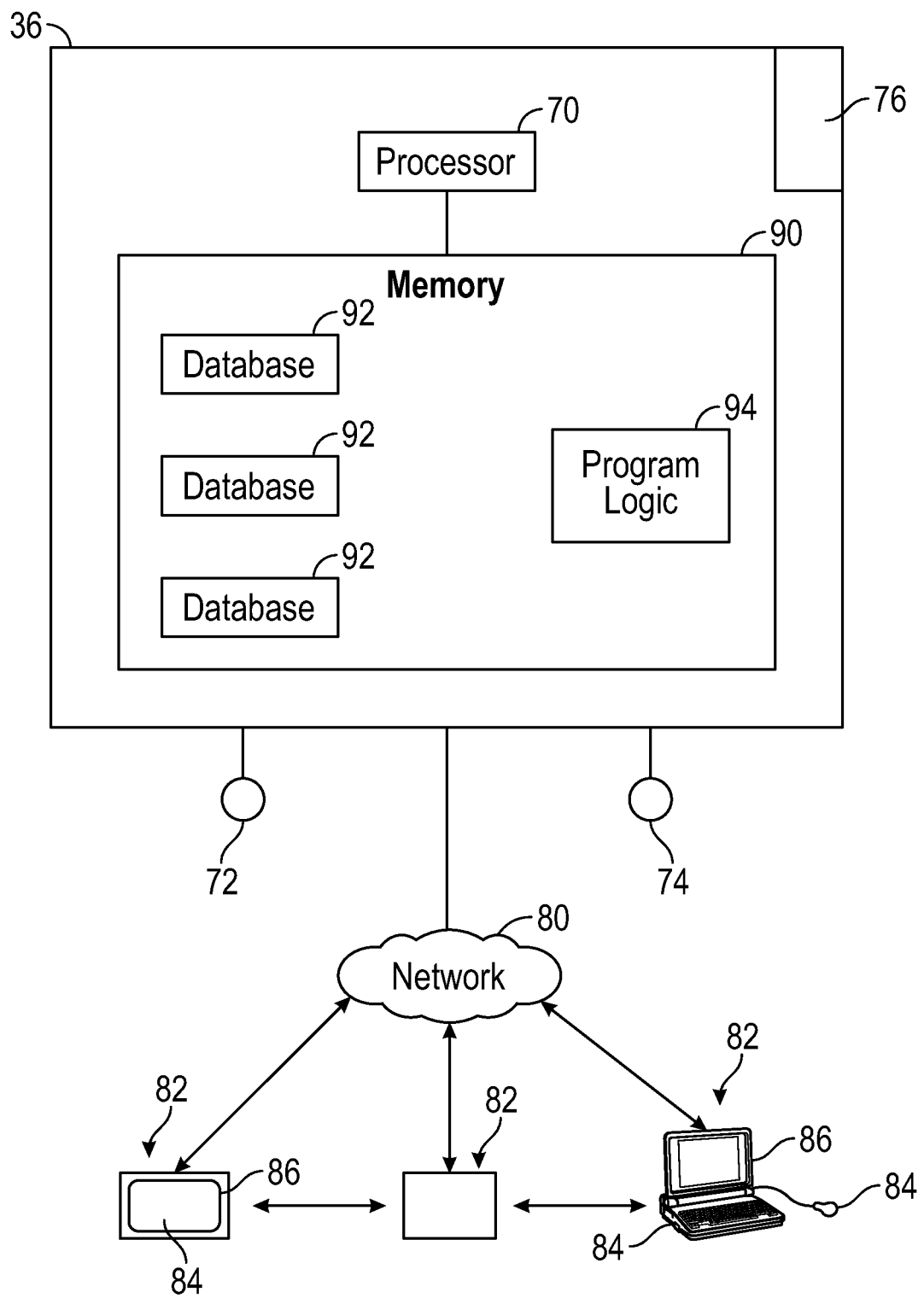
FIG. 8 is a block diagram of an exemplary image-capturing computer system in accordance with the present disclosure.

Referring to FIGS. 3 and 8, the image-capturing computer system 36 may be a system or systems that are able to embody and/or execute the logic of the processes described herein. Logic embodied in the form of software instructions, such as image display and analysis software, and/or firmware may be executed on any appropriate hardware. For example, logic embodied in the form of software instructions or firmware may be executed on a dedicated system or systems, or on a personal computer system, or on a distributed processing computer system, and/or the like. In some embodiments, logic may be implemented in a stand-alone environment operating on a single computer system and/or logic may be implemented in a networked environment, such as a distributed system using multiple computers and/or processors.

In some embodiments, the image-capturing computer system 36 may include one or more processors 70 communicating with one or more image-capturing input devices 72, image-capturing output devices 74, and/or I/O ports 76 enabling the input and/or output of data to and from the image-capturing computer system 36.

FIG. 8 illustrates the image-capturing computer system 36 having a single processor 70. It should be noted, however, that the image-capturing computer system 36 may include multiple processors 70. In some embodiments, the processor 70 may be partially or completely network-based or cloud-based. The processor 70 may or may not be located in a single physical location. Additionally, multiple processors 70 may or may not necessarily be located in a single physical location.

The one or more image-capturing input devices 72 may be capable of receiving information input from a user and/or processor(s), and transmitting such information to the processor 70. The one or more image-capturing input devices 72 may include, but are not limited to, implementation as a keyboard, touchscreen, mouse, trackball, microphone, fingerprint reader, infrared port, slide-out keyboard, flip-out keyboard, cell phone, PDA, video game controller, remote control, fax machine, network interface, speech recognition, gesture recognition, eye tracking, brain-computer interface, combinations thereof, and/or the like.

The one or more image-capturing output devices 74 may be capable of outputting information in a form perceivable by a user and/or processor(s). For example, the one or more image-capturing output devices 74 may include, but are not limited to, implementations as a computer monitor, a screen, a touchscreen, a speaker, a website, a television set, a smart phone, a PDA, a cell phone, a fax machine, a printer, a laptop computer, an optical head-mounted display (OHMD), combinations thereof, and/or the like. It is to be understood that in some exemplary embodiments, the one or more image-capturing input devices 72 and the one or more image-capturing output devices 74 may be implemented as a single device, such as, for example, a touchscreen or a tablet.

One or more data signals 40, 52, 54, 56, 58, 60, 62, 64 and/or 66 may be provided to the image-capturing computer system 36, such as from one or more other corresponding component of the image-capturing system 14, such as the image-capturing devices 20, the GPS receiver 24, the INU 26, the clock 28, the gyroscope 30, the compass 32, and/or the altimeter 34. For example, the data signals 40, 52, 54, 56, 58, 60, 62, 64, and/or 66, may be received by the image-capturing computer system 36 via the I/O port 76. The I/O 76 port may comprise one or more physical and/or virtual ports.

In some embodiments, the image-capturing computer system 36 may be in communication with one or more additional processors 82 as illustrated in FIG. 8. In this example, the image-capturing computer system 36 may communicate with the one or more additional processors 82 via a network 80. As used herein, the terms "network-based", "cloud-based", and any variations thereof, may include the provision of configurable computational resources on demand via interfacing with a computer and/or computer network, with software and/or data at least partially located on the computer and/or computer network, by pooling processing power of two or more networked processors.

In some embodiments, the network 80 may be the Internet and/or other network. For example, if the network 80 is the Internet, a primary user interface of the image-capturing software and/or image manipulation software may be delivered through a series of web pages. It should be noted that the primary user interface of the image-capturing software and/or image manipulation software may be replaced by another type of interface, such as, for example, a Windows-based application.

The network 80 may be almost any type of network. For example, the network 80 may interface by optical and/or electronic interfaces, and/or may use a plurality of network topographies and/or protocols including, but not limited to, Ethernet, TCP/IP, circuit switched paths, and/or combinations thereof. For example, in some embodiments, the network 80 may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, a public switched telephone network, an Ethernet network, combinations thereof, and/or the like. Additionally, the network 80 may use a variety of network protocols to permit bi-directional interface and/or communication of data and/or information. It is conceivable that in the near future, embodiments of the present disclosure may use more advanced networking topologies.

The image-capturing computer system 36 may be capable of interfacing and/or communicating with the one or more computer systems including processors 82 via the network 80. Additionally, the one or more processors 82 may be capable of communicating with each other via the network 80. For example, the image-capturing computer system 36 may be capable of interfacing by exchanging signals (e.g., analog, digital, optical, and/or the like) via one or more ports (e.g., physical ports or virtual ports) using a network protocol, for example.

The processors 82 may include, but are not limited to implementation as a variety of different types of computer systems, such as a server system having multiple servers in a configuration suitable to provide a commercial computer based business system (such as a commercial web-site), a personal computer, a smart phone, a network-capable television set, a television set-top box, a tablet, an e-book reader, a laptop computer, a desktop computer, a network-capable handheld device, a video game console, a server, a digital video recorder, a DVD player, a Blu-Ray player, a wearable computer, a ubiquitous computer, combinations thereof, and/or the like.

In some embodiments, the computer systems comprising the processors 82 may include one or more input devices 84, one or more output devices 86, processor executable code, and/or a web browser capable of accessing a website and/or communicating information and/or data over a network, such as network 80. The computer systems comprising the one or more processors 82 may include one or more non-transient memory comprising processor executable code and/or software applications, for example. The image-capturing computer system 36 may be modified to communicate with any of these processors 82 and/or future developed devices capable of communicating with the image-capturing computer system 36 via the network 80.

The one or more input devices 84 may be capable of receiving information input from a user, processors, and/or environment, and transmit such information to the processor 82 and/or the network 80. The one or more input devices 84 may include, but are not limited to, implementation as a keyboard, touchscreen, mouse, trackball, microphone, fingerprint reader, infrared port, slide-out keyboard, flip-out keyboard, cell phone, PDA, video game controller, remote control, fax machine, network interface, speech recognition, gesture recognition, eye tracking, brain-computer interface, combinations thereof, and/or the like.

The one or more output devices 86 may be capable of outputting information in a form perceivable by a user and/or processor(s). For example, the one or more output devices 86 may include, but are not limited to, implementations as a computer monitor, a screen, a touchscreen, a speaker, a website, a television set, a smart phone, a PDA, a cell phone, a fax machine, a printer, a laptop computer, an optical head-mounted display (OHMD), combinations thereof, and/or the like. It is to be understood that in some exemplary embodiments, the one or more input devices 84 and the one or more output devices 86 may be implemented as a single device, such as, for example, a touchscreen or a tablet.

Referring to FIGS. 3 and 8, in some embodiments, the image-capturing computer system 36 may include one or more processors 70 working together, or independently to execute processor executable code, and one or more non-transitory memories 90 capable of storing processor executable code. In some embodiments, each element of the image-capturing computer system 36 may be partially or completely network-based or cloud-based, and may or may not be located in a single physical location.

The one or more processors 70 may be implemented as a single or plurality of processors working together, or independently, to execute the logic as described herein. Exemplary embodiments of the one or more processors 70 may include, but are not limited to, a digital signal processor (DSP), a central processing unit (CPU), a field programmable gate array (FPGA), a microprocessor, a multi-core processor, and/or combination thereof, for example. The one or more processors 70 may be capable of communicating via the network 80, illustrated in FIG. 8, by exchanging signals (e.g., analog, digital, optical, and/or the like) via one or more ports (e.g., physical or virtual ports) using a network protocol. It is to be understood, that in certain embodiments, using more than one processor 70, the processors 70 may be located remotely from one another, in the same location, or comprising a unitary multi-core processor. The one or more processors 70 may be capable of reading and/or executing processor executable code and/or capable of creating, manipulating, retrieving, altering, and/or storing data structures into one or more memories 90.

The one or more memories 90 may be capable of storing processor executable code. Additionally, the one or more memories 90 may be implemented as a conventional non-transient memory, such as, for example, random access memory (RAM), a CD-ROM, a hard drive, a solid state drive, a flash drive, a memory card, a DVD-ROM, a floppy disk, a non-transitory optical drive, combinations thereof, and/or the like, for example.

In some embodiments, the one or more memories 90 may be located in the same physical location as the image-capturing computer system 36. Alternatively, one or more memories 90 may be located in a different physical location as the image-capturing computer system 36, the with image-capturing computer system 36 communicating with one or more memories 90 via a network such as the network 80, for example. Additionally, one or more of the memories 90 may be implemented as a "cloud memory" (i.e., one or more memories 90 may be partially or completely based on or accessed using a network, such as network 80, for example).

The one or more memories 90 may store processor executable code and/or information comprising one or more databases 92 and program logic 94. In some embodiments, the processor executable code may be stored as a data structure, such as a database and/or data table, for example.

Examples of the imaging system 10 in use will now be described. Initially, the imaging system 10 may pass over a geographic target area and may capture input images using the image-capturing devices 20, as shown in FIG. 4. As shown in FIG. 5A, the image-capturing devices 20 each have a first orientation of the field of view and a first focal length. The first orientation of the field of view of each image-capturing device 20 may be originally set such that a set of input images, comprising an input image captured by each of the image-capturing device 20, depicts the geographic coverage sub-areas $A_1$-$A_5$ that are contiguous, substantially contiguous, or partially overlapping, such as shown in FIG. 1A, for example.

During the flight of the imaging system 10, the first focal length of the image-capturing devices 20 may be changed to a second focal length, different from the first focal length. For example, the first focal length may be changed to change the resolution of the input images captured by the image-capturing devices 20. In one example, the altitude of the imaging system 10 may be changed from a first altitude to a second altitude, and the first focal length may be changed to the second focal length to maintain the original resolution, or improve the resolution, at the second altitude. The changes of focal length are precise and the focal lengths may be stored in one or more non-transitory computer memory and associated with the corresponding input images.

Figure 6A:
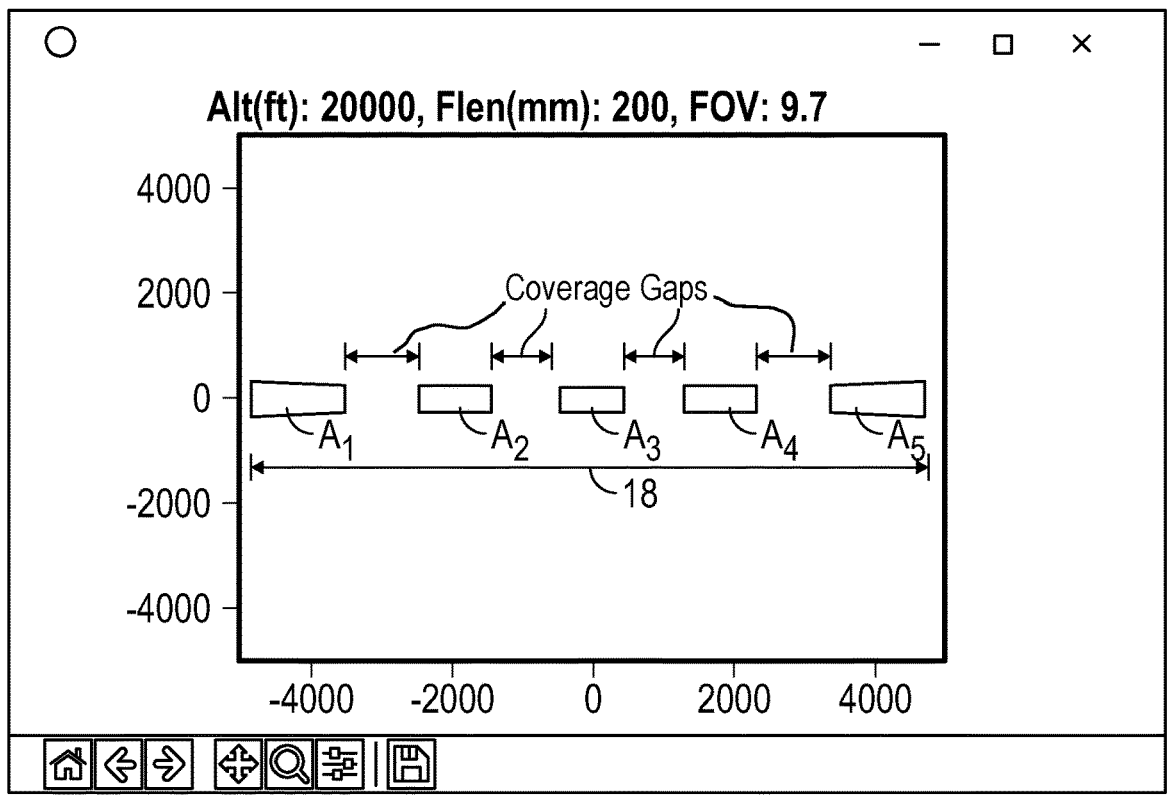
FIG. 6A is graphical representation of a simulated capture area of a target area of an exemplary image-capturing system in accordance with the present disclosure positioned at an altitude of 20,000 feet after a variation in focal length.

However, when the first focal length is changed to the second focal length, the geographic coverage sub-area $A_1$-$A_5$ of each of the image-capturing devices 20 will also change, if the first orientation of the field of view of the image-capturing devices 20 remains the same, thereby creating coverage gaps between the geographic coverage sub-areas A1-A5 depicted in the set of input images, as shown in FIG. 6A.

Figure 6B:
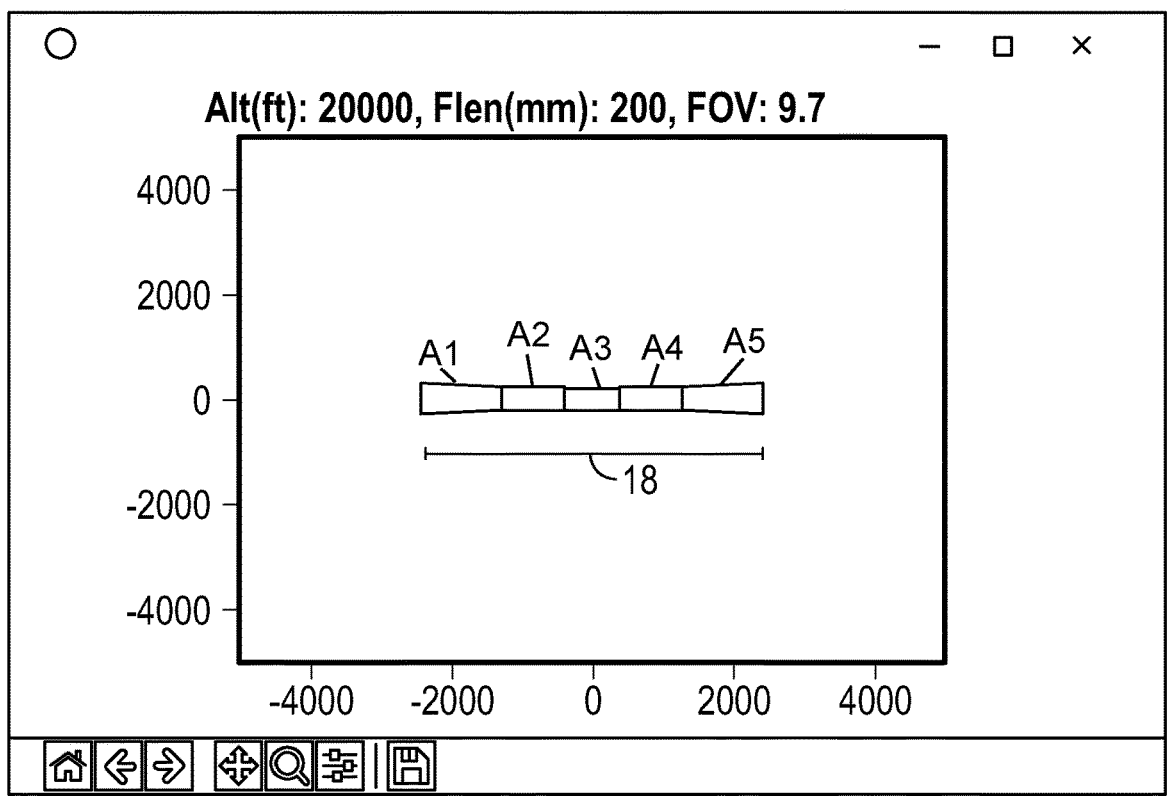
FIG. 6B is a graphical representation of another simulated capture area of the target area of the image-capturing system in FIG. 6A after adjustment of the angles of fields-of-view in accordance with the present disclosure.

To avoid creating the coverage gaps when the focal lengths are changed, or to maintain a desired overlap of the coverage sub-areas, or to remove the coverage gaps, such that a substantially continuous coverage area is captured, as shown in FIG. 6B, the image-capturing system 14 may determine the Offset Angles, such as by using Equations 1 and 2, between adjacent ones of the image-capturing devices 20 and may adjust the image-capturing devices 20 to change the first orientations of the fields of view of the image-capturing devices 20 to the second orientations of the fields of view based on the determined Offset Angles.

The image-capturing system 14 may adjust the orientations of the fields of view of one or more of the image-capturing devices 20 in conjunction with the change to the focal lengths. For purposes of this disclosure, the term "in conjunction with" may mean simultaneously with, or within a time range of, the instant the focal lengths are changed. In one embodiment, the time range may be plus or minus (that is, before or after the instant the focal lengths are changed) between approximately zero seconds and five minutes of the instant the focal lengths are changed. In one embodiment, the time range may be plus or minus between zero seconds and fifteen minutes of the instant the focal lengths are changed.

The image-capturing system 14 may adjust the image-capturing devices 20 in any manner that changes the orientations of the fields of view of the image-capturing devices 20. For example, the image-capturing system 14 may rotate the image-capturing devices 20 on a gimbal, and/or rotate one or more mirror within a line of sight of the image-capturing devices 20, and/or adjust one or more angle 98 to change the orientation FOV of the image-capturing devices 20. The change to the orientation of the field of view of each of the image-capturing devices 20 may be the same or may vary, such as varying based on the original orientation of the field of view of each of the image-capturing devices 20 and/or based on variations in the change to the focal lengths.

The effect of changes (such as angle changes) to the orientations of the fields of view of the image-capturing devices 20 on the geographic coverage sub-areas $A_1$-$A_5$ of the input images is multiplied by the altitude of the imaging system 10. In contrast, a change to the linear displacement of the image-capturing devices 20 in relation to one another in a mathematical plane changes the locations of the geographic coverage sub-area $A_1$-$A_5$ only by the same amount as the linear displacement of the image-capturing devices 20.

In one embodiment, the imaging system 10 may map the fields of view to the surface 16 and may determine an amount of overlap desired of the geographic coverage sub-areas $A_1$-$A_5$. The imaging system 10, or an external computer processor 82, may then calculate the adjustment to the orientations of the fields of view of the image-capturing devices 20 based at least in part on the mapping of the field of view to the surface 16 and the desired overlap. Generally, an overlap is desired of the geographic coverage sub-areas A1-A5 depicted in the input images of the image-capturing devices 20, because an exact match between edges of the geographic coverage sub-areas $A_1$-$A_5$ is difficult to maintain (for example, due to variability in optics and mounts). Additionally, overlap provides multiple images of the same data points in the overlap area, which can be utilized in creating the virtual mosaic image by matching similar points. In one embodiment, the percentage of overlap is more than approximately 5%. A maximum amount of overlap may be based on efficiency considerations, since more overlap means easier matching, but requires more passes over the target area by the imaging system 10 to capture the entire target area in the input images, since the overlap reduces that overall coverage of the geographic area 18 of the set of input images. The amount of overlap may be adjusted based on desired matching-accuracy and flight-efficiency. In one embodiment, the percentage of overlap is more than approximately 5% and less than approximately 25%. In one embodiment, the percentage of overlap is more than approximately 5% and less than approximately 75%.

In some embodiments, the image-capturing computer system 36 may issue an image-capturing signal to the image-capturing device(s) 20 to thereby cause those device (s) to acquire and/or capture image data, including the set of input images, at a predetermined location and/or at a predetermined interval. In some embodiments, the image-capturing computer system 36 and/or the processor 82 may issue the image-capturing signal dependent on at least in part on the velocity or altitude of the platform 12, for example. Additionally, the image-capturing computer system 36 and/or the processor 82 may issue one or more signals to the image-capturing device(s) 20 and/or the lens assemblies 42 to adjust the orientations of the fields of view and/or focal length of one or more of the image-capturing device(s) 20. The computer system 36 and/or the processor 82 may issue a first signal a first signal to change the two or more image-capturing devices 20 from the first focal length to the second focal length and a second signal to change the two or more image-capturing devices 20 from the first orientation of the field of view to the second orientation of the field of view.

The image-capturing computer system 36 may determine the adjustment to the orientations of the fields of view based on the changed focal length utilizing, for example Equations 1 and 2, and then by utilizing the determined Offset Angle.

The image-capturing computer system 36 may execute the program logic 94 which may control the reading, manipulation, and/or storing of the data signals 40, 52, 54, 56, 58, 62, 64, and/or 66. For example, the program logic may read the data signals 40 of the image data, and may store them within the one or more memories 90. Each of the data signals 52, 54, 56, 58, 60, 62, 64, and/or 66, may represent conditions existing at the instance that the image data (e.g., the set of input images) is acquired and/or captured by the image-capturing devices 20. The program logic 94 of the image-capturing computer system 36 may decode, as necessary, and/or store the aforementioned signals within the memory 90, and/or associate the data signals with the corresponding image data signal(s) 40. Thus, for example, the altitude, orientation, roll, pitch, yaw of each image-capturing device 20 relative to the surface 16 and/or object of interest for images captured may be known or determined such that location of the image-capturing device 20 may be determined. Additionally, the X, Y, Z location (e.g., latitude, longitude, and altitude) of an object, location, or capture area seen within the images or location seen in each image may be determined. More particularly, the X, Y, Z location (e.g., latitude, longitude, and altitude) of a targeted object or location may be determined and/or the position of each image-capturing device 20. For example, prior to collection of image data, each image-capturing device 20 may be calibrated such that original position of the image-capturing device 20 is known.

During flight, the orientations of the fields of view of the image-capturing device(s) may be adjusted manually, semi-automatically, or automatically to shift the geographic coverage sub-areas $A_1$-$A_5$ and/or the capture area 18 for the image data 40 of the input images in the set of input images. The orientations of the fields of view of the image-capturing device(s) 20 and/or position of the image-capturing device 20 and related calibration may be determined and/or known by the image-capturing computer system 36. In some embodiments, one or more of the data signals 52, 54, 56, 58, 60, 62, 64, and/or 66 may be used to determine location of one or more of the image-capturing device 20 and/or adjustment of the lens assembly 42 for the one or more image-capturing device(s) 20.

The platform 12 may be piloted and/or guided through an image-capturing path that may pass over the target area of the surface 16. The number of times the platform 12 and/or image-capturing devices 20 passes over the area of interest may be dependent at least in part upon the size of the target area, the amount of detail desired in the captured images, and/or the amount of overlap of the geographic coverage sub-areas $A_1$-$A_5$. By varying the overlap, the orientations of the image-capturing devices 20, and/or the focal lengths of the image-capturing devices 20, and/or altitude of the platform 12, the number of times the platform 12 and/or the image-capturing devices 20 pass over the area of interest may be decreased. The imaging system 10 is configured to allow for variance of position of the orientations of the fields of view of the one or more image-capturing devices 20 within the imaging system 10 and variance of focal lengths of the one or more image-capturing devices during flight.

As the platform 12 passes over the target area, one or more set of input images may be captured by the image-capturing devices 20. In some embodiments, the set of input images may be captured and/or acquired by the image-capturing devices 20 at predetermined image capture intervals that may be dependent, at least in part, upon the velocity of the platform 12, for example.

The image data signals 40 corresponding to each input image acquired may be received by and/or stored within the one or more memories 90 of the image-capturing computer system 36 via the I/O port 76. Similarly, the data signals 52, 54, 56, 58, 60, 62, 64, and/or 66 corresponding to each captured input image may be received and stored within the one or more memories 90 of the image-capturing computer system 36 via the I/O port 76.

The processor 70 may create and/or store in the one or more memories 90, one or more output image and data files. For example, the processor 70 may convert the image data signals 40, and/or the data signals, 52, 54, 56, 58, 60, 62, 64, into computer-readable output image, and/or data files. The output image and/or data files may include a plurality of captured image files corresponding to captured input images, positional data, and/or focal length corresponding thereto.

The output image and data files may be further provided, displayed, and/or used for obtaining measurements of and between objects depicted within the captured images, (e.g., measurements of the heights of such objects). In some embodiments, the image-capturing computer system 36 may be used to provide, display, and/or obtain measurements of and between objects depicted within the captured images. Alternatively, the image-capturing computer system 36 may deliver the output image, and/or data files to one or more processors, such as, for example, the processors 82, for the processors 82 to provide, display and/or obtain measurement.

In some embodiments, delivery of the output image, and/or data files may also be by physical removal of the files from the image-capturing computer system 36. For example, the output image, and/or data files may be stored on a removable storage device and transported to one or more processors 82. In some embodiments, the image-capturing computer system 36 may provide at least a portion of the display and/or determine at least a portion of the measurements further described herein.

Exemplary methods for georeferencing the imagery may be found in at least U.S. Pat. Nos. 7,424,133 and 5,247,356 and U.S. patent application Ser. No. 16/343,610 (Pub. No. US2020/0059601A1 titled "An Image Synthesis System"), for example, which are hereby incorporated by reference in their entirety herein.

The imaging system 10, and/or one or more processor, may create one or more virtual mosaic image depicting one or more of the capture area 18 formed from two or more of the input images depicting the image geographic coverage sub-areas $A_1$-$A_5$. The virtual mosaic image is larger than what is capable of being captured from a single sensor. The virtual mosaic image created of the capture area 18 may or may not be continuous, based on whether the image areas $A_1$-$A_5$ are contiguous, substantially contiguous, and/or overlapping. Accuracy may be increased and expense decreased if the image areas $A_1$-$A_5$ are contiguous, substantially contiguous, and/or overlapping. Georeferencing the virtual mosaic images formed from capturing contiguous, substantially contiguous, or partially overlapping geographic coverage sub-areas $A_1$-$A_5$ in a single flight pass by the platform 12 (such as an aircraft) is more accurate than georeferencing virtual mosaic images formed from non-contiguous geographic coverage sub-areas $A_1$-$A_5$. The method avoids creating coverage gaps and therefore avoids the platform 12 making additional flight passes to capture additional images depicting the gaps. This reduces error in part because the time between a first flight pass and a second flight pass introduces error in calculations regarding the geo-locations of the pixels of the virtual mosaic image (for example, readings from the GPS receiver 24 or the INU 26 may drift). Additionally, a single flight pass is more efficient than using multiple flight passes of the target area in terms of time and cost.

In some embodiments, the imaging system 10 may be configured to provide for selective variable positioning adjustments of one or more sensors of the image-capturing device(s) 20 and provide for selective variable focal length adjustments of one or more sensors of the image-capturing device(s) 20. For example, the imaging system 10 may include one or more image-capturing devices 20, with at least one image-capturing device 20 having a sensor array with one or more sensors 44 configured to be selectively adjusted in orientation of the field of view within the sensor array and one or more sensors 44 of the sensor array configured to have focal length selectively adjusted during flight to maintain a substantially continuous capture area 18.

The location of the image-capturing devices 20 relative to the surface 16 at the precise moment each input image is captured by the image-capturing devices 20 may be recorded within the one or more memories 90 and associated with the corresponding captured image and/or virtual image. Additionally, the focal length of each image-capturing device 20 may be recorded within the one or more memories 90 and associated with the corresponding captured input image and/or the virtual mosaic image.

Figure 9:
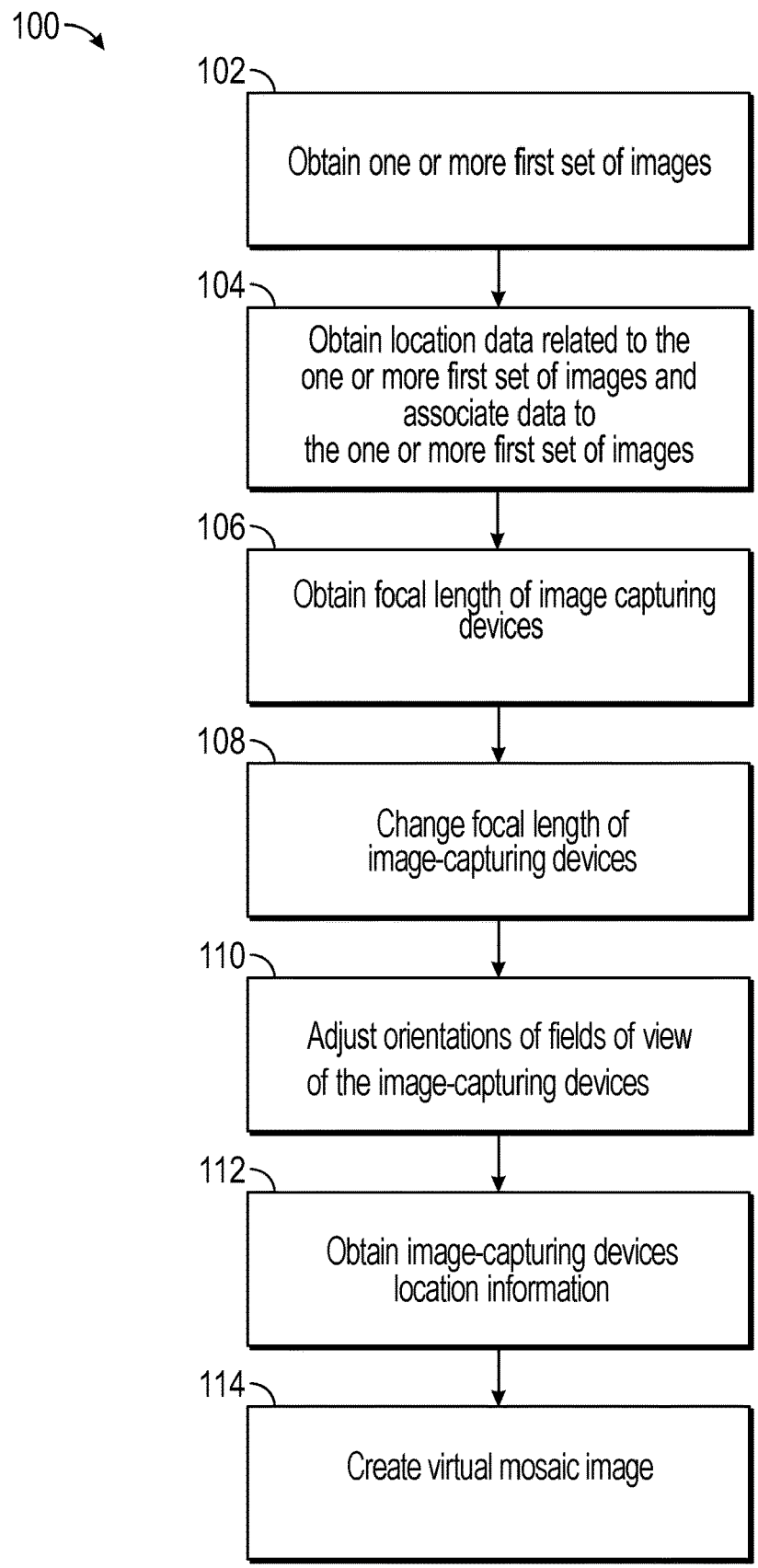
FIG. 9 is a flow chart of an exemplary method of creating a virtual mosaic image having a capture area of a target area that is larger than what is capable of being captured from a single sensor.

FIG. 9 illustrates a flow chart of an exemplary method 100 of obtaining one or more sets of input images having continuous coverage, substantially continuous coverage, and/or partially overlapping coverage of the target area, such as for creating one or more virtual mosaic image, in which the imaging system 10 configured to obtain the images is configured to provide for variations in focal length and for variations in orientations of the fields of view of the two or more image-capturing devices 20.

In a step 102, the imaging system 10 may fly over or near the target area and one or more first set of input images may be obtained (e.g., image data signals 40), such as via the image-capturing computer system 36. In a step 104, the image-capturing computer system 36 may obtain location data related to the one or more first set of input images (e.g., the data signals 52, 54, 56, 58, 60, 62 and/or 64) and associate the data to the one or more input images.

In a step 106, the image-capturing computer system 36 may obtain data related to the focal length of the one or more image-capturing devices 20. For example, as shown in FIG. 6A, the focal lengths of the image-capturing devices 20 is known (e.g., 200 mm) or determined when the imaging system 10 flies over the target area and the one or more first set of input images is obtained. The orientation of the field of view of each image-capturing device 20 may be known and/or determined.

In a step 108, the focal lengths of the image-capturing devices 20 may be changed (such as to change resolution of the resulting images and/or to maintain a previous resolution in conjunction with a change in altitude of the imaging system 10).

In a step 110, to avoid (or eliminate) coverage gaps between the geographic coverage sub-areas $A_1$-$A_5$, at the same time as, or after, or before, the focal lengths are changed, the orientations of the fields of view of the image-capturing device(s) 20 may be adjusted, thereby providing continuous or partially overlapping coverage of the target area. The image-capturing computer system 36 may determine the Offset Angles, such as by using Equations 1 and 2, between adjacent ones of the image-capturing devices 20 and may utilize the Offset Angles to adjust the orientations of the fields of view of the image-capturing device(s) 20.

In a step 112, the location and position of the image-capturing devices 20 relative to the surface 16 at the precise moment each input image is captured may be recorded or determined within the one or more memories 90 and associated with the corresponding captured image within the set of input images. Additionally, the focal length of each image-capturing device 20 may be recorded within the one or more memories 90 and associated with the corresponding captured image. Such data may be used to geo-reference pixels of the input images.

In a step 114, optionally, one or more of the input images may be utilized to create a virtual mosaic image.

Although the preceding description has been described herein with reference to particular means, materials, and embodiments, it is not intended to be limited to the particulars disclosed herein; rather, it extends to all functionally equivalent structures, methods and uses, such as are within the scope of the appended claims.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment.

The following is a numbered list of non-limiting illustrative embodiments of the inventive concept disclosed herein Clause 1. An imaging system, comprising:
an image-capturing system positioned on a platform such that the platform moves the image-capturing system over a predefined target area at a first altitude above the Earth's surface, the image-capturing system comprising:
two or more cameras, each of the two or more cameras adjustable between a first focal length and a second focal length, and adjustable between a first orientation of a field of view and a second orientation of the field of view, the two or more cameras configured to capture a set of two or more input images depicting partially overlapping geographic coverage sub-areas when the two or more cameras are at the first focal length and the first orientation of the field of view; and
one or more processor executing image display and analysis software configured to send one or more signal from the one or more processor to the image-capturing system to change the two or more cameras from the first focal length to the second focal length and to change the two or more cameras from the first orientation of the field of view to the second orientation of the field of view, wherein a change from the first focal length to the second focal length introduces coverage gaps between the geographic coverage sub-areas, and wherein the change from the first orientation of the field of view to the second orientation of the field of view eliminates the coverage gaps.

Clause 2. The imaging system of Clause 1, wherein the set of two or more input images is a first set of two or more input images, and wherein the one or more processor executing image display and analysis software reads a second set of two or more input images subsequent to changing from the first orientation of the field of view to the second orientation of the field of view.

Clause 3. The imaging system of Clause 2, wherein the second set of two or more input images has a higher resolution as compared to the first set of two or more input images.

Clause 4. The imaging system of Clause 2, wherein the second set of two or more input images has a substantially continuous coverage area within the predefined target area.

Clause 5. The imaging system of Clause 1, wherein the set of two or more input images has a substantially continuous coverage area within the predefined target area.

Clause 6. The imaging system of Clause 2, wherein the first set of two or more input images is provided at the first altitude and the second set of two or more input images is provided at a second altitude.

Clause 7. The imaging system of Clause 2, wherein the one or more processor creates one or more virtual mosaic image of the predefined target area utilizing the second set of two or more input images.

Clause 8. The imaging system of Clause 2, wherein the one or more processor determines the second orientation of the field of view based on the change from the first focal length to the second focal length of each of the two or more cameras.

Clause 9. The imaging system of Clause 2, wherein the one or more signal from the one or more processor to the image-capturing system comprises a first signal to change the two or more cameras from the first focal length to the second focal length and a second signal to change the two or more cameras from the first orientation of the field of view to the second orientation of the field of view.

Clause 10. The imaging system of Clause 2, wherein the one or more processor determines an amount of change from the first orientation of the field of view to the second orientation of the field of view based at least on the amount of change from the first focal length to the second focal length.

Clause 11. A method, comprising
determining, using one or more computer processor, for two or more image-capturing devices having corresponding first focal lengths, second focal lengths, and first orientations of fields of view, positioned on an aerial platform and configured to capture a set of input images comprising two or more corresponding input images, second orientations of the fields of view based at least in part on maintaining partially overlapping geographic coverage in the two or more input images; and
sending, using the one or more computer processor, one or more signal to the two or more image-capturing devices, indicative of one or more command to change the first focal lengths to the second focal lengths and to change the first orientations of the fields of view to the determined second orientations of the fields of view.

Clause 12. The method of Clause 11, further comprising receiving, via the one or more computer processor, the set of input images having partially overlapping geographic coverage in the two or more input images.

Clause 13. The method of Clause 11, wherein partially overlapping is overlapping by more than approximately 5% and less than approximately 25%.

Clause 14. The method of Clause 11, further comprising creating, with the one or more computer processor, one or more virtual mosaic image of a predefined target area utilizing the set of two or more input images.

Clause 15. The method of Clause 11, further comprising georeferencing the two or more input images.

Clause 16. The method of Clause 11, wherein sending, using the one or more computer processor, the one or more signal to the two or more image-capturing devices, indicative of one or more command to change the first focal lengths to the second focal lengths and to change the first orientations of the fields of view to the determined second orientations of the fields of view in conjunction with the change of the first focal lengths to the second focal lengths.

Clause 17. A method, comprising:
sending, using one or more computer processor, one or more first signal to two or more image-capturing devices, each of the two or more image-capturing devices having corresponding first focal lengths and first orientations of fields of view, such that the two or more image-capturing devices are configured to capture a set of input images comprising a first input image depicting a first geographic coverage sub-area and a second input image depicting a second geographic coverage sub-area that partially overlaps the first geographic coverage sub-area, the one or more first signal indicative of a command to change the first focal lengths to second focal lengths;
determining, using the one or more computer processor, second orientations of the fields of view of each of the two or more image-capturing devices based at least in part on the change from the first focal lengths to the second focal lengths, to avoid or eliminate a coverage gap between the first input image and the second input image; and
sending, using the one or more computer processor, one or more second signal to the two or more image-capturing devices, indicative of a command to change the first orientations of the fields of view of each of the two or more image-capturing devices to the second orientations of the fields of view.

Clause 18. The method of Clause 17, further comprising creating, with the one or more computer processor, one or more virtual mosaic image of a predefined target area utilizing the set of input images.

Clause 19. The method of Clause 17, further comprising georeferencing the set of input images.

Clause 20. The method of Clause 17, wherein the two or more image-capturing devices comprise two or more cameras.

Clause 21. The method of Clause 17, wherein determining, using the one or more computer processor, second orientations of the fields of view of each of the two or more image-capturing devices is based on a determined offset angle between field-of-view centerlines of adjacent ones of the two or more image-capturing devices.

Clause 22. The method of Clause 21, wherein the offset angle is determined by multiplying the angle indicative of the field of view by (1−the percentage overlap).

Clause 23. The method of Clause 22, wherein the angle indicative of the field of view is determined based on $(2*\tan^{-1}(\text{Sensor Width}/(2*\text{Focal Length})))$.

Clause 24. The system of Clause 1, wherein the change from the first orientation of the field of view to the second orientation of the field of view is based on a determined offset angle between field-of-view centerlines of adjacent ones of the two or more cameras.

Clause 25. The system of Clause 21, wherein the offset angle is determined by multiplying the angle indicative of the field of view by (1−the percentage overlap).

Clause 26. The system of Clause 25, wherein the angle indicative of the field of view is determined based on $(2*\tan^{-1}(\text{Sensor Width}/(2*\text{Focal Length})))$.

Clause 27. The method of Clause 11, wherein determining second orientations of the fields of view is based on a determined offset angle between field-of-view centerlines of adjacent ones of the two or more image-capturing devices.

Clause 28. The method of Clause 27, wherein the offset angle is determined by multiplying the angle indicative of the field of view by (1−the percentage overlap).

Clause 29. The method of Clause 28, wherein the angle indicative of the field of view is determined based on $(2*\tan^{-1}(\text{Sensor Width}/(2*\text{Focal Length})))$.

What is claimed is:

1. An imaging system, comprising:
    an image-capturing system positioned on a platform such that the platform moves the image-capturing system over a predefined target area at a first altitude above the Earth's surface, the image-capturing system comprising:
        two or more cameras, each of the two or more cameras adjustable between a first focal length and a second focal length, and adjustable between a first orientation of a field of view and a second orientation of the field of view, the two or more cameras configured to capture a set of two or more input images depicting partially overlapping geographic coverage sub-areas when the two or more cameras are at the first focal length and the first orientation of the field of view; and
    one or more processor executing image display and analysis software configured to send one or more signal from the one or more processor to the image-capturing system to change the two or more cameras from the first focal length to the second focal length and to change the two or more cameras from the first orientation of the field of view to the second orientation of the field of view, wherein a change from the first focal length to the second focal length introduces coverage gaps between the geographic coverage sub-areas, and wherein the change from the first orientation of the field of view to the second orientation of the field of view eliminates the coverage gaps.

2. The imaging system of claim 1, wherein the set of two or more input images is a first set of two or more input images, and wherein the one or more processor executing image display and analysis software reads a second set of two or more input images subsequent to changing from the first orientation of the field of view to the second orientation of the field of view.

3. The imaging system of claim 2, wherein the second set of two or more input images has a higher resolution as compared to the first set of two or more input images.

4. The imaging system of claim 2, wherein the second set of two or more input images has a substantially continuous coverage area within the predefined target area.

5. The imaging system of claim 1, wherein the set of two or more input images has a substantially continuous coverage area within the predefined target area.

6. The imaging system of claim 2, wherein the first set of two or more input images is provided at the first altitude and the second set of two or more input images is provided at a second altitude.

7. The imaging system of claim 2, wherein the one or more processor creates one or more virtual mosaic image of the predefined target area utilizing the second set of two or more input images.

8. The imaging system of claim 2, wherein the one or more processor determines the second orientation of the field of view based on the change from the first focal length to the second focal length of each of the two or more cameras.

9. The imaging system of claim 2, wherein the one or more signal from the one or more processor to the image-capturing system comprises a first signal to change the two or more cameras from the first focal length to the second focal length and a second signal to change the two or more cameras from the first orientation of the field of view to the second orientation of the field of view.

10. The imaging system of claim 2, wherein the one or more processor determines an amount of change from the first orientation of the field of view to the second orientation of the field of view based at least on the amount of change from the first focal length to the second focal length.

11. A method, comprising
    determining, using one or more computer processor, for two or more image-capturing devices having corresponding first focal lengths and first orientations of fields of view, positioned on an aerial platform flying at a first altitude and configured to capture a first set of input images comprising two or more corresponding input images having a first resolution, second orientations of the fields of view based at least in part on maintaining partially overlapping geographic coverage in the two or more input images at a second altitude different than the first altitude;
    moving the aerial platform to the second altitude from the first altitude; and
    sending, using the one or more computer processor, one or more signal to the two or more image-capturing devices, indicative of one or more command to change the first focal lengths to second focal lengths such that a second set of input images comprising two or more input images captured at the second altitude have a second resolution higher than the first resolution, and to change the first orientations of the fields of view to the determined second orientations of the fields of view such that partially overlapping geographic coverage in the two or more input images of the second set of input images is maintained when the aerial platform is moved to the second altitude from the first altitude.

12. The method of claim 11, further comprising receiving, via the one or more computer processor, the second set of input images having partially overlapping geographic coverage in the two or more input images.

13. The method of claim 11, wherein partially overlapping is overlapping by more than approximately 5% and less than approximately 25%.

14. The method of claim 11, further comprising creating, with the one or more computer processor, one or more virtual mosaic image of a predefined target area utilizing the second set of two or more input images.

15. The method of claim 11, further comprising georeferencing the second set of two or more input images.

16. The method of claim 11, wherein sending, using the one or more computer processor, the one or more signal to the two or more image-capturing devices, indicative of one or more command to change the first focal lengths to the second focal lengths and to change the first orientations of the fields of view to the determined second orientations of the fields of view is in conjunction with the change of the first focal lengths to the second focal lengths.

17. A method, comprising:
sending, using one or more computer processor, one or more first signal to two or more image-capturing devices, each of the two or more image-capturing devices having corresponding first focal lengths and first orientations of fields of view, such that the two or more image-capturing devices are configured to capture a first set of input images comprising a first input image depicting a first geographic coverage sub-area and a second input image depicting a second geographic coverage sub-area that partially overlaps the first geographic coverage sub-area, the one or more first signal indicative of a command to change the first focal lengths to second focal lengths;
determining, using the one or more computer processor, second orientations of the fields of view of each of the two or more image-capturing devices based at least in part on the change from the first focal lengths to the second focal lengths, to avoid or eliminate a coverage gap between the first input image and the second input image;
sending, using the one or more computer processor, one or more second signal to the two or more image-capturing devices, indicative of a command to change the first orientations of the fields of view of each of the two or more image-capturing devices to the second orientations of the fields of view; and
capturing, using the two or more image-capturing devices having the corresponding second focal lengths and second orientations of the fields of view, a second set of input images comprising two or more partially overlapping input images, wherein the second focal lengths cause the second set of input images to have a higher resolution than the first set of input images.

18. The method of claim 17, further comprising creating, with the one or more computer processor, one or more virtual mosaic image of a predefined target area utilizing the set of input images.

19. The method of claim 17, further comprising georeferencing the set of input images.

20. The method of claim 17, wherein the two or more image-capturing devices comprise two or more cameras.

* * * * *

UNITED STATES PATENT AND TRADEMARK OFFICE
CERTIFICATE OF CORRECTION

| | | |
|---|---|---|
| PATENT NO. | : 12,464,246 B2 | Page 1 of 1 |
| APPLICATION NO. | : 18/249643 | |
| DATED | : November 4, 2025 | |
| INVENTOR(S) | : Frank Giuffrida | |

It is certified that error appears in the above-identified patent and that said Letters Patent is hereby corrected as shown below:

In the Specification

Column 1, Lines 8-13: Delete the paragraph in its entirety and insert -- This application is a national stage filing under 35 U.S.C. § 371 of the PCT Application identified as Serial Number PCT/US21/55630, Publication Number WO 2022/086976, filed October 19, 2021, titled "VARIABLE FOCAL LENGTH MULTI-CAMERA AERIAL IMAGING SYSTEM AND METHOD", which claims the benefit of U.S. Provisional Patent Application Number 63/093,562, filed October 19, 2020, entitled "VARIABLE FOCAL LENGTH MULTI-CAMERA AERIAL IMAGING SYSTEM AND METHOD", all of which are hereby incorporated in their entirety herein. --

Figure 1B:
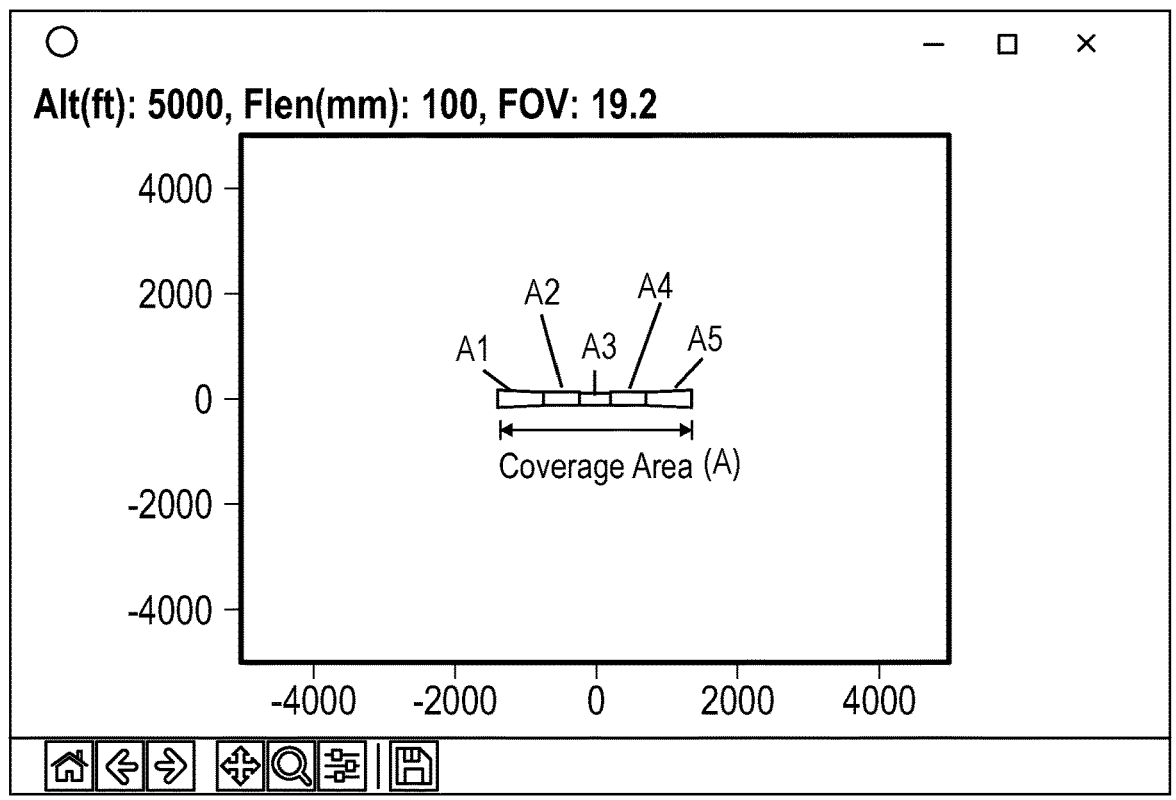
FIG. 1B is a graphical representation of the capture area of the simulated multi-camera system of FIG. 1A simulated at an altitude of 5,000 feet.
Figure 1C:
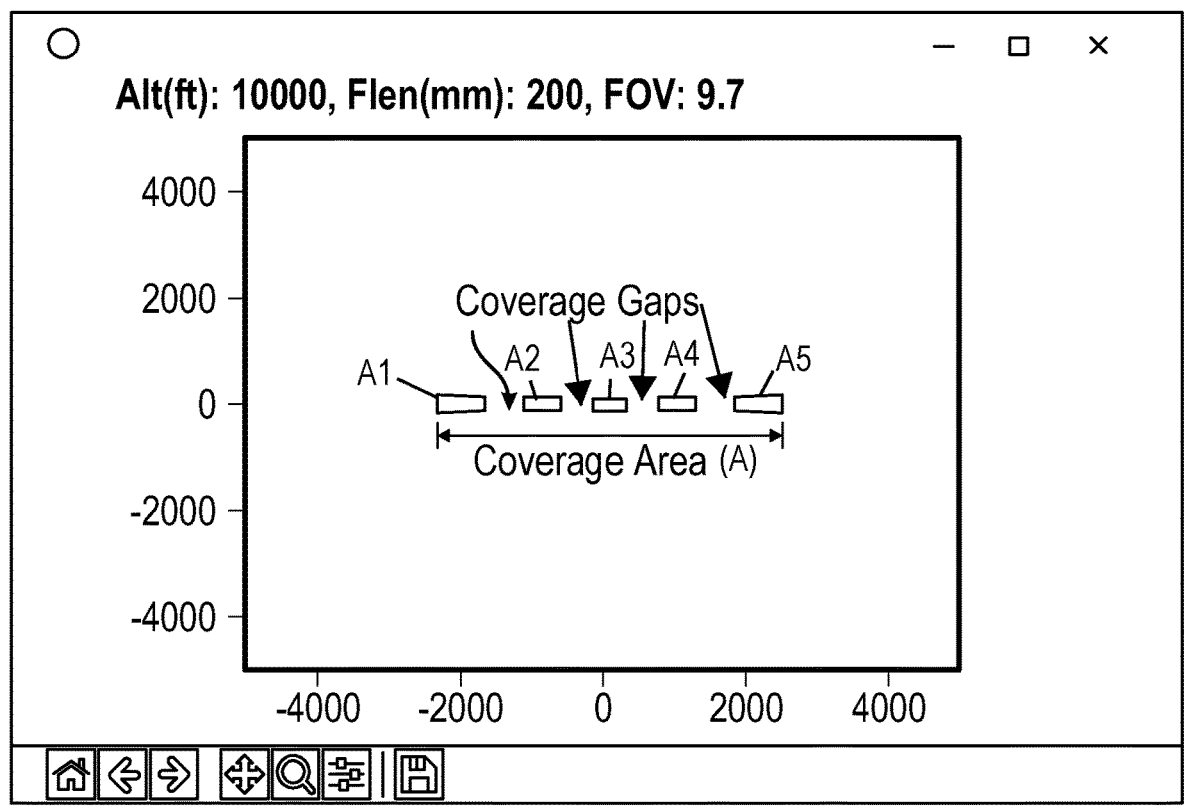
FIG. 1C is a graphical representation of the capture area of the simulated multi-camera system of FIG. 1A having an increased fixed focal length and simulated at 10,000 feet.
Figure 1D:
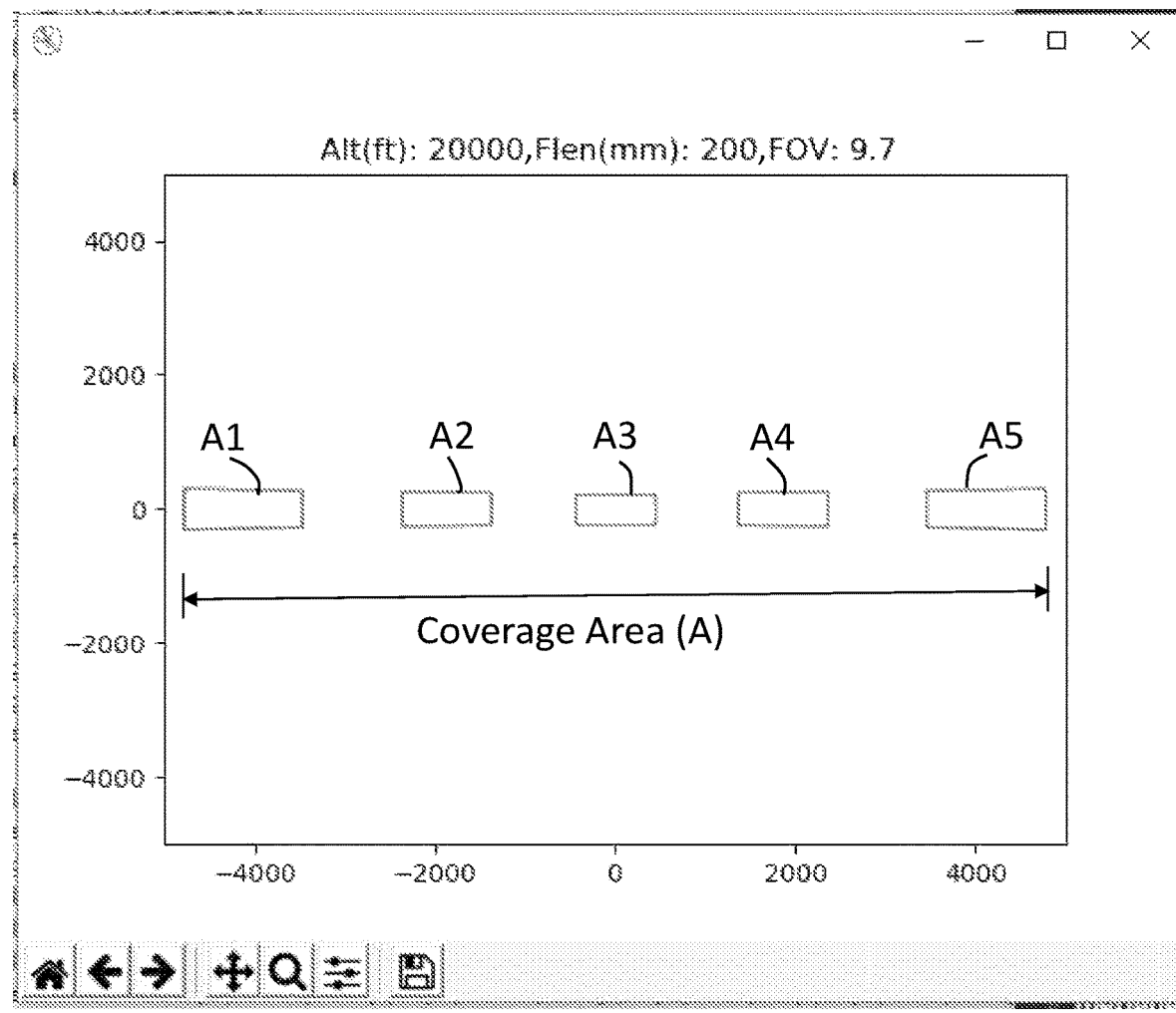
FIG. 1D a graphical representation of the capture area of the simulated multi-camera system of FIG. 1A wherein the fixed focal length of the multi-camera system is increased relative to the simulated multi-camera system of FIG. 1A and simulated to be at 20,000 feet.

Column 2, Line 50: Delete "FIG. 13" and replace with -- FIG. 1B --

Column 21, Line 8: After "58," insert -- 60, --

Column 21, Line 34: After "devices(s)" insert -- 20 --

Signed and Sealed this
Thirtieth Day of December, 2025

John A. Squires
*Director of the United States Patent and Trademark Office*